(12) United States Patent
Kitsutaka

(10) Patent No.: US 7,042,463 B2
(45) Date of Patent: May 9, 2006

(54) IMAGE GENERATING SYSTEM AND PROGRAM

(75) Inventor: Shigeru Kitsutaka, Kawasaki (JP)

(73) Assignee: Namco Ltd., Tokyo (JP)

( * ) Notice: Subject to any disclaimer, the term of this patent is extended or adjusted under 35 U.S.C. 154(b) by 379 days.

(21) Appl. No.: 09/913,281

(22) PCT Filed: Dec. 15, 2000

(86) PCT No.: PCT/JP00/08885

§ 371 (c)(1),
(2), (4) Date: Aug. 27, 2001

(65) Prior Publication Data

US 2002/0158888 A1 Oct. 31, 2002

(30) Foreign Application Priority Data

Dec. 17, 1999 (JP) .......................... 11-358326

(51) Int. Cl.
G09G 5/02 (2006.01)

(52) U.S. Cl. ....................... 345/592; 345/589; 345/422; 345/629; 345/630

(58) Field of Classification Search ................ 345/589, 345/592, 422, 629, 630
See application file for complete search history.

(56) References Cited

U.S. PATENT DOCUMENTS 5,850,224 A * 12/1998 Sakuraba ................... 345/422
6,380,945 B1 * 4/2002 MacInnis et al. ........... 345/602

FOREIGN PATENT DOCUMENTS

| EP | A1 0 610 080 | 8/1994 |
| EP | 1 056 050 A1 | 11/2000 |
| JP | A 6-231273 | 8/1994 |
| JP | A 09-091451 | 4/1997 |
| JP | A 10-222694 | 8/1998 |
| JP | A 11-242753 | 9/1999 |
| JP | A 2000-251090 | 9/2000 |
| WO | WO 00/25269 A1 | 5/2000 |
| WO | WO 00/52640 A1 | 9/2000 |

* cited by examiner

Primary Examiner—Matthew C. Bella
Assistant Examiner—Tam Tran
(74) Attorney, Agent, or Firm—Oliff & Berridge, PLC

(57) ABSTRACT

It is an object to provide an image generating system and program which can generate such an image as in the real world with reduced processing load. The alpha-value for each pixel in the original image is set to a value corresponding to its Z-value. The set alpha-value is used to perform alpha-blending between the original image and a defocused image. As the difference between the Z-value of the focus and the depth value increases, the synthesis ratio of the defocused image is increased. The range of depth of field and defocusing effect are controlled by varying the corresponding relationship between the Z-value and the alpha-value. The alpha-value is set such that the alpha-value for an pixel located in an area AR1 between Z1 and Z2 will be set to α1, the alpha-value for an pixel located in an area AR2 between Z2 and Z3 will be set to α2 and so forth. The alpha-value is set by updating the alpha-value of a pixel located farther from an object when the object is drawn in a frame buffer. When the original image is set as a texture which is in turn mapped through the bi-linear filtering method, the defocused image is generated by shifting the texture coordinates by a value smaller than one texel.

16 Claims, 18 Drawing Sheets

FIG. 3A ORIGINAL IMAGE
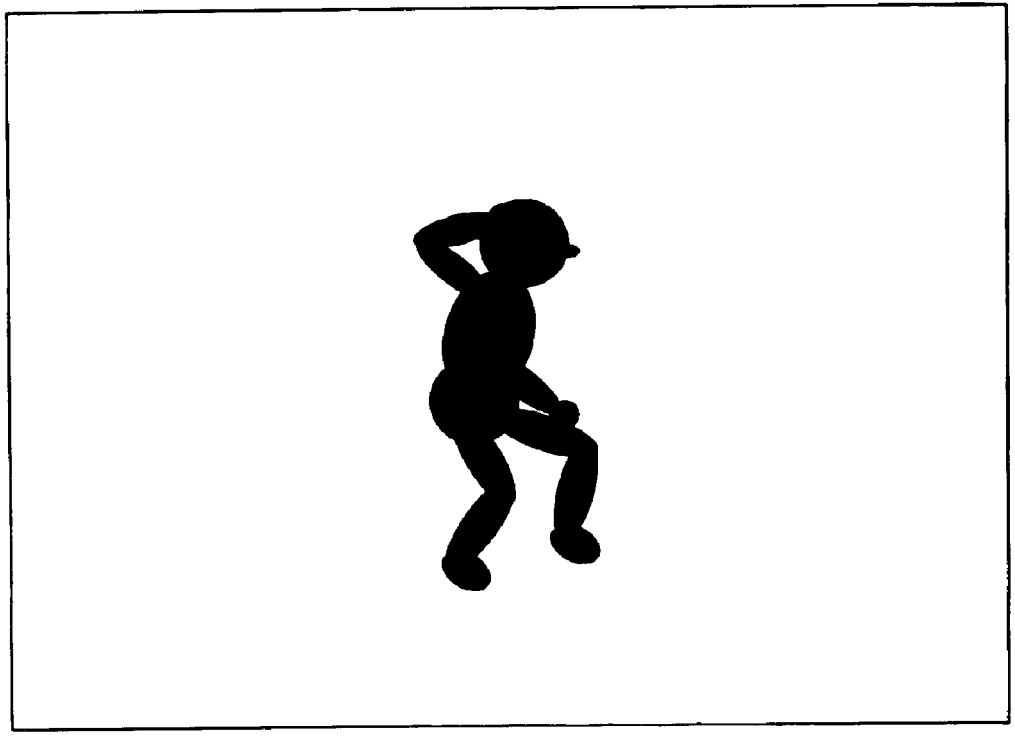
FIG. 3B DEFOCUSED IMAGE
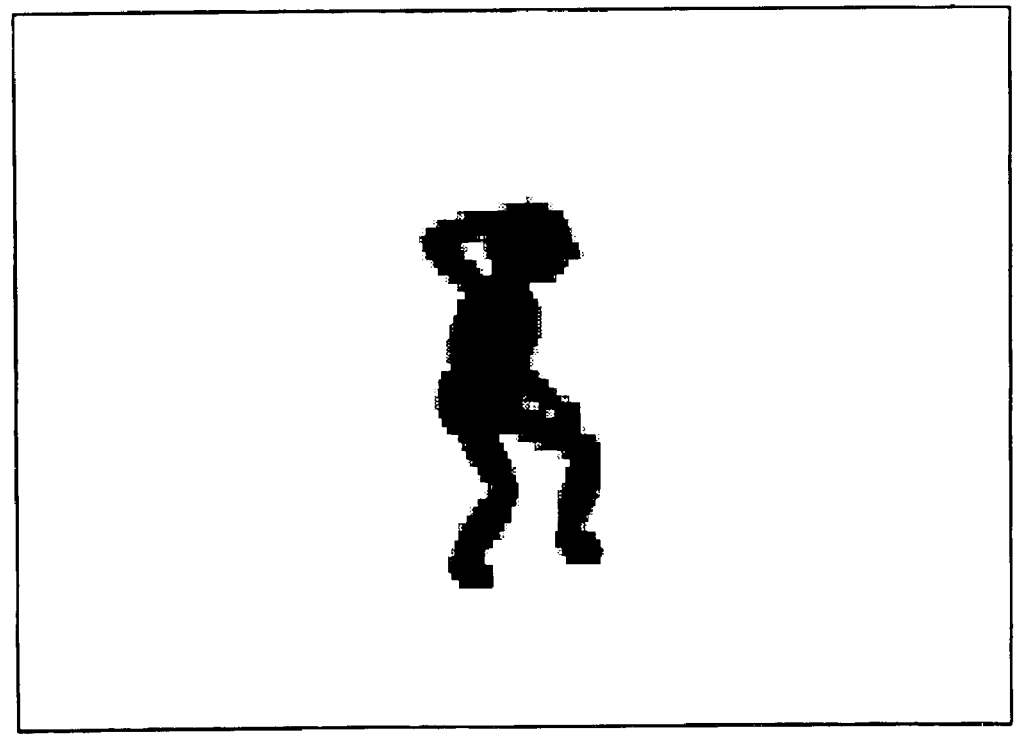

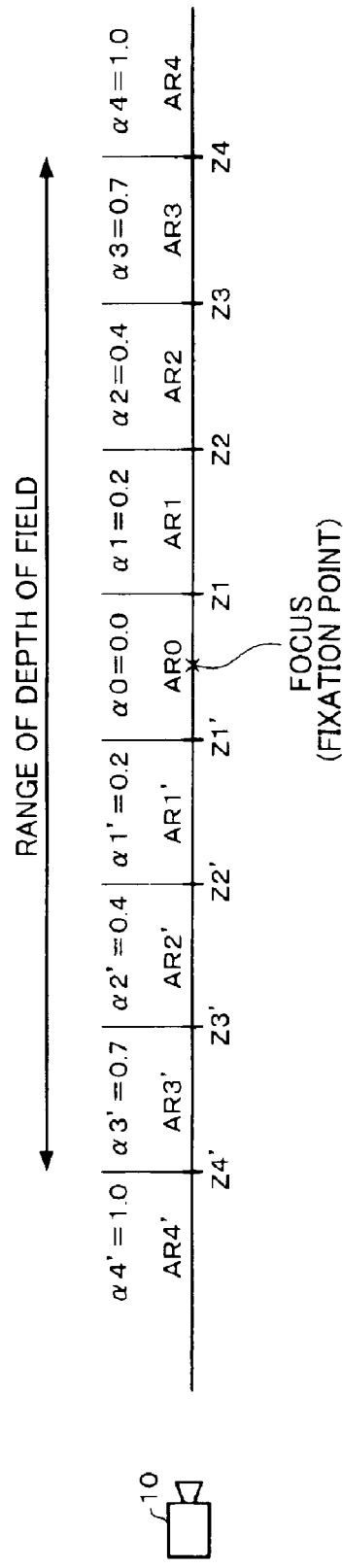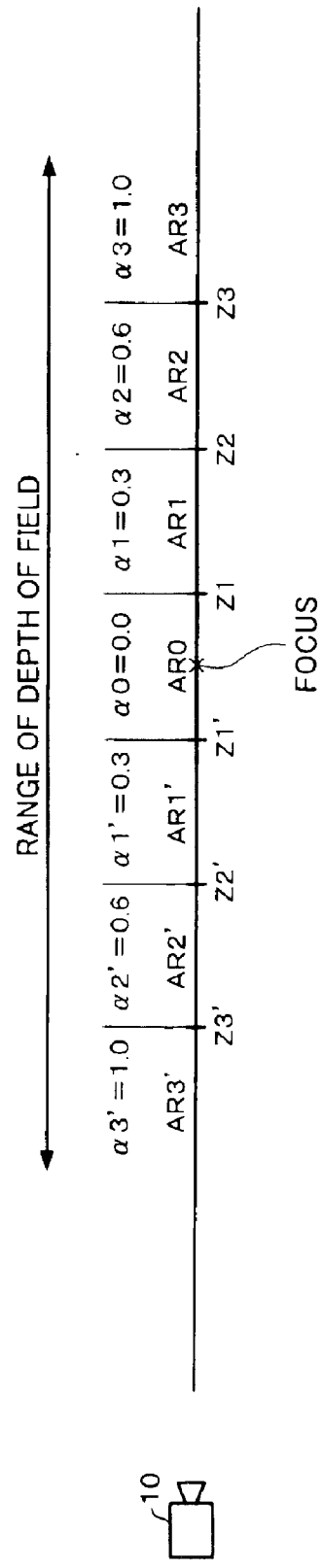

FIG. 5A
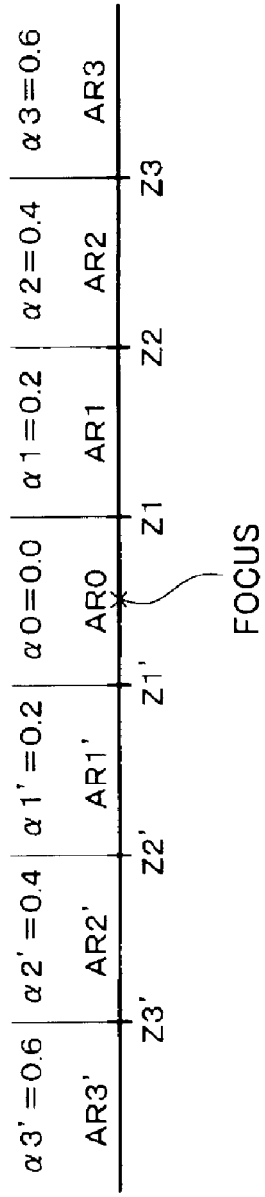
FIG. 5B
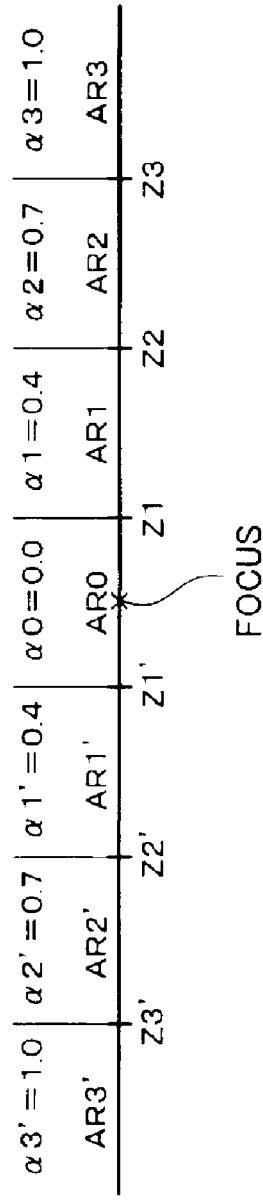

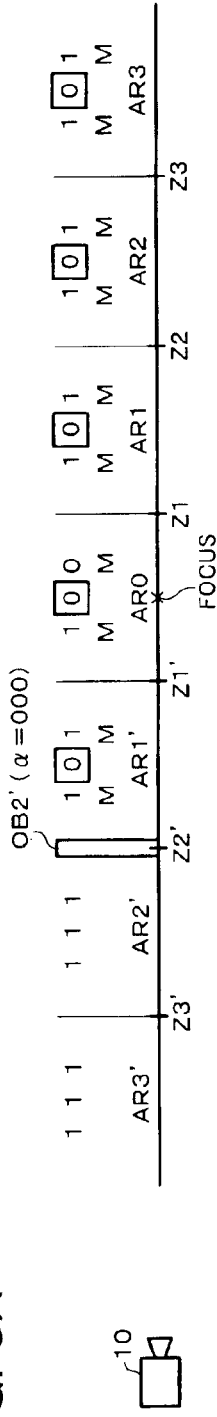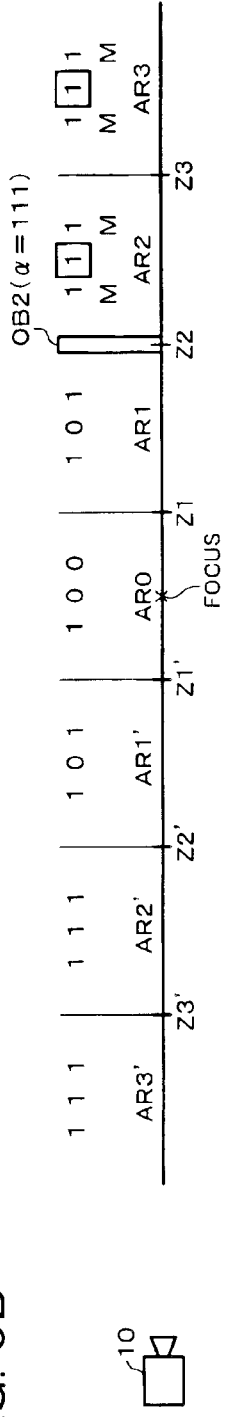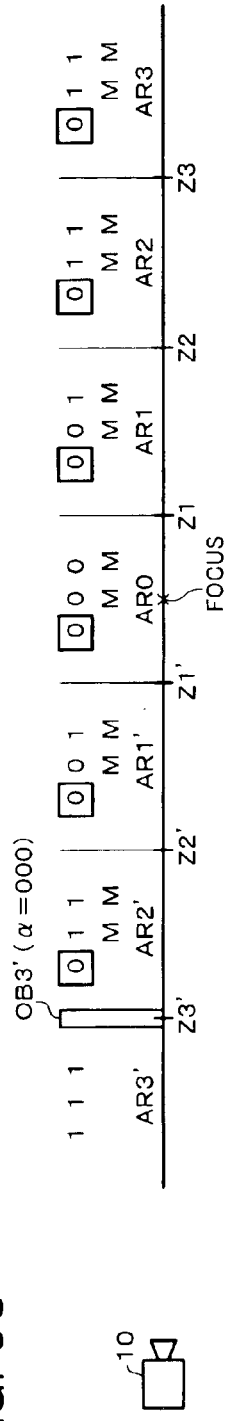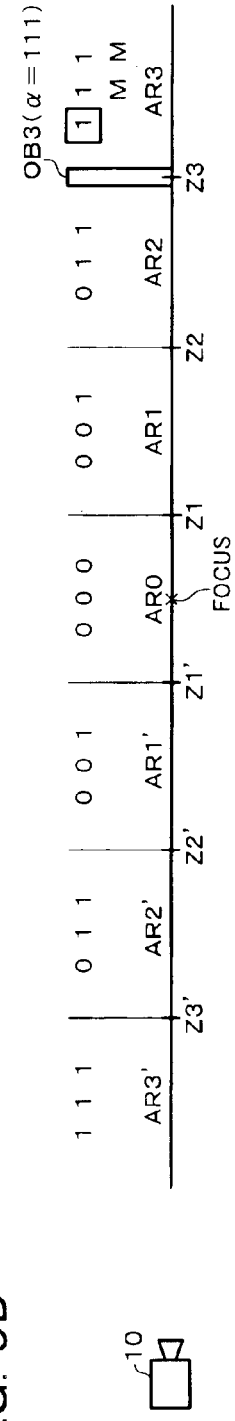
FIG. 9A
FIG. 9B
FIG. 9C
FIG. 9D

|   |   |   |   |   |
|---|---|---|---|---|
|   | $\frac{1}{16}$ | $\frac{2}{16}$ | $\frac{1}{16}$ |   |
|   | $\frac{2}{16}$ | $\frac{4}{16}$ | $\frac{2}{16}$ |   |
|   | $\frac{1}{16}$ | $\frac{2}{16}$ | $\frac{1}{16}$ |   |
|   |   |   |   |   |

FIG. 14B

| $\frac{1}{256}$ | $\frac{4}{256}$ | $\frac{6}{256}$ | $\frac{4}{256}$ | $\frac{1}{256}$ |
|---|---|---|---|---|
| $\frac{4}{256}$ | $\frac{16}{256}$ | $\frac{24}{256}$ | $\frac{16}{256}$ | $\frac{4}{256}$ |
| $\frac{6}{256}$ | $\frac{24}{256}$ | $\frac{36}{256}$ | $\frac{24}{256}$ | $\frac{6}{256}$ |
| $\frac{4}{256}$ | $\frac{16}{256}$ | $\frac{24}{256}$ | $\frac{16}{256}$ | $\frac{4}{256}$ |
| $\frac{1}{256}$ | $\frac{4}{256}$ | $\frac{6}{256}$ | $\frac{4}{256}$ | $\frac{1}{256}$ |

IMAGE GENERATING SYSTEM AND PROGRAM

TECHNICAL FIELD

The present invention relates to an image generating system and program.

BACKGROUND OF ART

In the prior art, there is known an image generating system which can generate an image viewable from a given viewpoint in an object space that is a virtual three-dimensional space. Such an image generating system is very popular as a system which can realize a so-called virtual reality. If the image generating system is for a racing game, a player can enjoy a three-dimensional game by controlling and running a racing car (or object) in the object space to compete with the other racing cars controlled by the other players or computer.

However, an image generated by the prior art image generating system will not be focused depending on the distance from a viewpoint as in the actual human view. Thus, the representation is such that all the subjects within the image are in focus.

The image in which all the subjects ranging between the short distance and the long distance are in focus is abnormal in our daily life.

To pursue the reality, it is desirable that an image is generated in which a focus is regulated depending on the distance between the viewpoint and an object or the direction of sight line. However, the processing load will be increased if a defocused image is generated by calculating the distance between an individual object and the viewpoint within a game space to process the degree of defocusing for each object.

In an image generating system which must generate an image corresponding to a real-time variable viewpoint using its limited hardware resource, it is important that a focused image as in the actual world can be generated using less processing load.

DISCLOSURE OF INVENTION

To overcome such a problem in the prior art, an object of the present invention is to provide an image generating system and program which can generate a focused image as in the actual world with less processing load.

To this end, the present invention provides an image generating system for generating an image, comprising: alpha-value setting means which sets an alpha-value for each pixel to a value corresponding to a depth value of the each pixel in an original image; and means for synthesizing the original image with a defocused image corresponding to the original image based on the alpha-value set for each pixel. The present invention also provides a computer-usable information storage medium including a program for realizing the above-described means. The present invention further provides a computer-usable program (including a program embodied in a carrier wave) which includes a processing routine for realizing the above-described means.

According to the present invention, the original image is synthesized with the defocused image based on the set alpha-value corresponding to the depth value for each pixel in the original image. Thus, the synthesis ratio and the like in the defocused image is variable depending on the depth value. Therefore, the depth of field may be represented, for example.

The alpha($\alpha$)-value is information stored in association with each pixel and may be information other than color information, for example. The depth value may be increased as the pixel moves faraway from or close to the viewpoint (or virtual camera). The technique of synthesizing the original image with the defocused image may be any of various known techniques. The synthesizing process using the alpha-value is not limited to the alpha-blending.

In the image generating system, information storage medium and program according to the present invention, the alpha-value setting means may set the alpha-value for the each pixel so that a synthesis ratio of the defocused image becomes higher for a pixel having a larger difference between a focal depth value of a virtual camera and the depth value of the each pixel.

In such a manner, such an image that is defocused as it is spaced faraway from the focus can be generated.

If the synthesis ratio of the defocused image increases as the alpha-value increases, the alpha-value may be increased as the difference between the depth value of the pixel and that of the focus increases. On the contrary, if the synthesis ratio of the defocused image increases as the alpha-value decreases, the alpha-value may be decreased as the difference between the depth value of the pixel and that of the focus increases.

In the image generating system, information storage medium and program according to the present invention, a range of depth of field or magnitude of defocusing effect may be variably controlled by varying a corresponding relationship between the depth value of the each pixel and the alpha-value.

Thus, an image in which the range of depth of field or the magnitude defocusing effect is variable can be generated merely by varying the corresponding relationship between the depth value and the alpha-value. This improves the variety in the representation of image.

The range of depth of field is not limited to any particular range, but maybe a range between the nearest and farthest points in which a focused clear image may be obtained. For example, the range of depth of field may be defined to be a range in which the alpha-value becomes smaller than a given value or larger than a given value. The control of the magnitude of the defocusing effect may be realized, for example, by utilizing the same depth value varying the magnitude of the alpha-value.

The present invention further provides an image generating system for generating an image, comprising: alpha-value setting means which sets an alpha-value for a pixel having a depth value located in an area AR1 between Z1 and Z2 as $\alpha$1, the alpha-value for a pixel having a depth value located in an area AR2 between Z2 and Z3 as $\alpha$2, . . . , and subsequently the alpha-value for a pixel having a depth value located in an area ARi between Zi and Zi+1 as $\alpha$i; and means for drawing an image based on the alpha-value set by the alpha-value setting means. The present invention further provides a computer-usable information storage medium including a program for realizing the above-described means. The present invention further provides a computer-usable program (including a program embodied in a carrier wave) which includes a processing routine for realizing the above-described means.

According to the present invention, the alpha-values for the pixels located at the areas AR1, AR2, to ARi are set into $\alpha$1, $\alpha$2, to $\alpha$i, respectively. The alpha-values $\alpha$1, $\alpha$2, to $\alpha$i thus set are used to draw the image. Thus, the alpha-value may simply be set depending on the associated depth value.

The corresponding relationship between the depth value and the alpha-value may also variably be controlled in a simple manner.

The drawing process based on the alpha-value set by the present invention is not limited to the synthesizing of the original image with the defocused image.

In the image generating system, information storage medium and program according to the present invention, the alpha-value setting means may update: the alpha-value of an pixel located in a first direction from an object OB1 having the depth value set as Z1 by drawing the object OB1 in a drawing area of an original image; the alpha-value of an pixel located in the first direction from an object OB2 having the depth value set as Z2 by drawing the object OB2 in the drawing area of the original image; . . . and subsequently the alpha-value of an pixel located in the first direction from an object OBi having the depth value set as Zi by drawing the object OBi in the drawing area of the original image.

In such a manner, the alpha-value can be set depending on the depth value through a light and high-speed process of only drawing objects.

The first direction may be one that extends farther or nearer as viewed from the object.

In the image generating system, information storage medium and program according to the present invention, the alpha-value setting means may update only a bit to be updated by masking a bit not to be updated when an object is drawn in the drawing area of the original image to update the alpha-value.

In such a manner, the alpha-value can be updated in bit unit. It is further desirable that the color or other information for each pixel is masked on updating the alpha-value.

In the image generating system, information storage medium and program according to the present invention, the alpha-value setting means may update: an n-th bit in the alpha-value of a pixel located in a first direction from an object OB1' having the depth value set as Z1' into a first level by drawing the object OB1' in a drawing area of an original image, and the n-th bit in the alpha-value of a pixel located in the first direction from an object OB1 having the depth value set as Z1 and located in the first direction from the object OB1' into a second level by drawing the object OB1 in the drawing area of the original image; an (n+1)-th bit in the alpha-value of a pixel located in the first direction from an object OB2' having the depth value set as Z2' into the first level by drawing the object OB2' in the drawing area of the original image, and the (n+1)-th bit in the alpha-value of a pixel located in the first direction from an object OB2 having the depth value set as Z2 and located in the first direction from the object OB2' into the second level by drawing the object OB2 in the drawing area of the original image; . . . and an (n+i−1)-th bit in the alpha-value of a pixel located in the first direction from an object OBi' having the depth value set as Zi' into the first level by drawing the object OBi' in the drawing area of the original image, and the (n+i−1)-th bit in the alpha-value of a pixel located in the first direction from an object OBi having the depth value set as Zi and located in the first direction from the object OBi' into the second level by drawing the object OBi in the drawing area of the original image.

The first direction may be one that extends farther or nearer as viewed from the object.

The present invention further provides an image generating system for generating an image, comprising: means for mapping a texture on an object by a texel interpolation method; and means for generating a defocused image for an original image by setting the original image as a texture and shifting a texture coordinate of the object when the texture is mapped on the object by the texel interpolation method. The present invention further provides a computer-usable information storage medium including a program for realizing the above-described means. The present invention further provides a computer-usable program (including a program embodied in a carrier wave) which includes a processing routine for realizing the above-described means.

According to the present invention, the defocused image can be generated through a simplified process by effectively using the texel interpolation method.

The texel interpolation method is not limited to any particular form, but may be a method in which the image information of a pixel can be obtained by interpolating the image information of a texel, for example, such as the bi-linear filtering or tri-linear filtering method.

In the image generating system, information storage medium and program according to the present invention, the defocused image of the original image may be generated by shifting the texture coordinate by a value smaller than one texel.

In the image generating system, information storage medium and program according to the present invention, the texture coordinates may be shifted to a first shift direction to perform the texture mapping by the texel interpolation method and then the texture coordinates may be shifted to a second shift direction to perform the texture mapping by the texel interpolation method.

Thus, a more ideal defocused image can be generated.

It is desirable that the first and second shift directions are opposite to each other. It is further desirable that a plurality of shift sets of the first and second shift directions are repeated.

In the image generating system, information storage medium and program according to the present invention, the object may be a virtual object having a shape substantially equal to a shape of a defocused area.

If the entire image is to be defocused, it is desirable that the objects and defocused area have the same shape as that of the screen. However, only part of the screen area may be defocused.

BRIEF DESCRIPTION OF THE DRAWINGS

FIGS. 3A and 3B show examples of the original and defocused images.

FIGS. 4A and 4B illustrate a technique of varying the corresponding relationship between Z-values and alpha-values to control the range of depth of field.

FIGS. 5A and 5B illustrate a technique of varying the corresponding relationship between Z-values and alpha-values to control the defocusing effect.

FIGS. 9A, 9B, 9C and 9D illustrate the details of still another alpha-value updating technique.

FIGS. 14A and 14B illustrate another principle of generating a more defocused image through the interpolation in the bi-linear filtering method.

BEST MODE FOR CARRYING OUT THE INVENTION

A preferred embodiment of the present invention will now be described with reference to the drawings.

1. Layout

Figure 1:
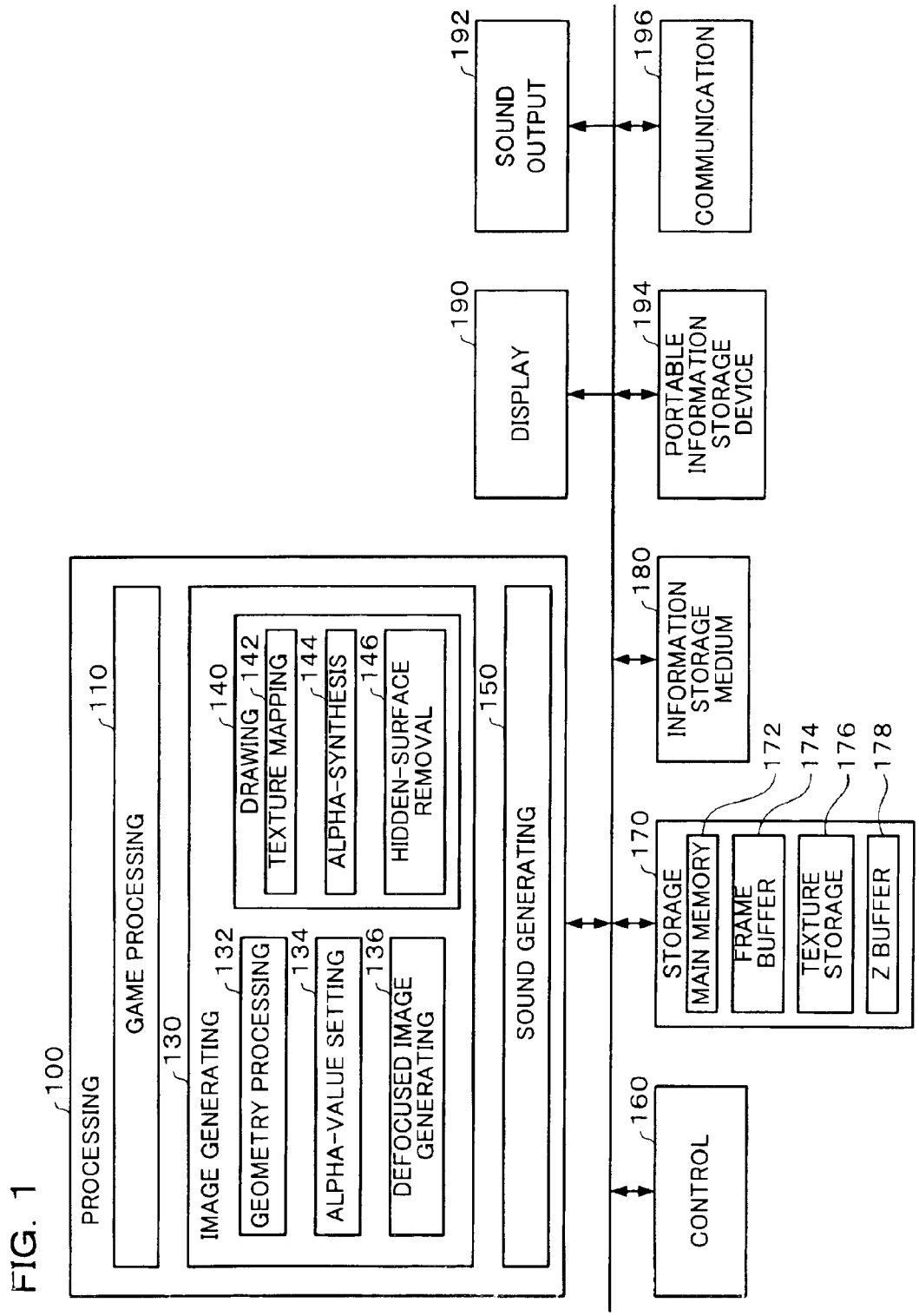
FIG. 1 is a block diagram of an image generating system according to this embodiment.

FIG. 1 shows a block diagram of this embodiment. In this figure, this embodiment may comprise at least a processing section 100 (or a processing section 100 with a storage section 170 or a processing section 100 with a storage section 170 and an information storage medium 180). Each of the other blocks (e.g., control section 160, display section 190, sound output section 192, portable information storage device 194 and communication section 196) may take any suitable form.

The processing section 100 is designed to perform various processings for control of the entire system, commands to the respective blocks in the system, game processing, image processing, sound processing and so on. The function thereof may be realized through any suitable hardware means such as various processors (CPU, DSP and so on) or ASIC (gate array or the like) or a given program (or game program).

The control section 160 is used to input operational data from the player and the function thereof maybe realized through any suitable hardware means such as a lever, a button, a housing or the like.

The storage section 170 provides a working area for the processing section 100, communication section 196 and others. The function thereof may be realized by any suitable hardware means such as RAM or the like.

The information storage medium (which may be a computer-usable storage medium) 180 is designed to store information including programs, data and others. The function thereof maybe realized through any suitable hardware means such as optical memory disk (CD or DVD), magneto-optical disk (MO), magnetic disk, hard disk, magnetic tape, memory (ROM) or the like. The processing section 100 performs various processings in the present invention (or this embodiment) based on the information that has been stored in this information storage medium 180. In other words, the information storage medium 180 stores various pieces of information (or programs and data) for realizing (or executing) the means of the present invention (or this embodiment) which are particularly represented by the blocks included in the processing section 100.

Part or the whole of the information stored in the information storage medium 150 will be transferred to the storage section 170 when the system is initially powered on. The information stored in the information storage medium 180 may contain at least one of program code set for processing the present invention, image data, sound data, shape data of objects to be displayed, table data, list data, information for instructing the processings in the present invention, information for performing the processings according to these instructions and so on.

The display section 190 is to output an image generated according to this embodiment and the function thereof can be realized by any suitable hardware means such as CRT, LCD or HMD (Head-Mount Display).

The sound output section 192 is to output a sound generated according to this embodiment and the function thereof can be realized by any suitable hardware means such as speaker.

The portable information storage device 194 is to store the player's personal data and save data and may be take any suitable form such as memory card, portable game machine and so on.

The communication section 196 is designed to perform various controls for communication between the game system and any external device (e.g., host device or other image generating system). The function thereof may be realized through any suitable hardware means such as various types of processors or communication ASIS or according to any suitable program.

The program or data for executing (or executing) the means in the present invention (or this embodiment) may be delivered from an information storage medium included in a host device (or server) to the information storage medium 180 through a network and the communication section 196. The use of such an information storage medium in the hose device (or server) falls within the scope of the invention.

The processing section 100 further comprises a game processing section 110, an image generating section 130 and a sound generating section 150.

The game processing section 110 is designed to perform various processes such as coin (or charge) reception, setting of various modes, game proceeding, setting of scene selection, determination of the position and rotation angle (about X-, Y- or Z-axis) of an object (one or more primitive faces), movement of the object (motion processing), determination of the viewpoint (or virtual camera's viewpoint) and view angle (or rotational angle of the virtual camera), arrangement of an object (or mapped object) within the object space, hit checking, computation of the game results (or scores), processing for causing a plurality of players to play in a common game space, various game computations including game-over and other processes, based on operational data from the control section 160 and according to the personal data, saved data and game program from the portable information storage device 194.

The image generating section 130 is to perform various image processings according to the commands or the like from the game processing section 110. For example, the image generating section 130 may generate an image viewable from the virtual camera (or viewpoint) within the object space and output it toward the display section 190. The sound generating section 150 is to perform various sound processings according to the commands and the like from the game processing section 110. The sound generating section 150 may generate various sounds such as BGMs, sound effects, voices or the like and output them toward the sound output section 192.

All the functions of the game processing section 110 and image, sound processing sections 130, 150 may be realized by any suitable hardware means or according to the program. Alternatively, these functions may be realized by both the hardware means and program.

The image generating section 130 comprises a geometry processing (or three-dimensional calculation) section 132, an alpha-value setting section 134, a defocused-image generating section 136 and a drawing (or rendering) section 140.

The geometry processing section 132 is designed to perform various geometry processings (three-dimensional calculations) such as coordinate transformation, clipping, perspective transformation and light source calculation. Object data (such as shape data including object vertex coordinates, vertex texture coordinates, brightness data and the like) obtained after the geometry processing (or perspective transformation) are then saved in a main memory 172 of the storage section 170.

The alpha-value setting section 134 is designed to set the alpha-value for each pixel (which is information stored in association with each pixel and may be information other than the color information) into a value corresponding to the Z-value (which is a depth value in a broad sense) for each pixel in an original image (e.g., perspectively transformed image). The alpha-value setting section 134 can variably control the range of depth of field and defocusing effect by varying the corresponding relationship between the depth value for each pixel and the alpha-value. Moreover, the alpha-value setting section 134 is to set the alpha-value for each pixel such that as that pixel is farther from the focus of the virtual camera, the alpha-value thereof will increase (or, in a broad sense, the synthesis ratio of the defocused image will increase).

The defocused-image generating section 136 is designed to generating a defocused (or most defocused) image obtained from an alpha-synthesis (e.g., alpha-blending, alpha-addition, alpha-subtraction, translucency processing or the like) with the original image.

More particularly, this embodiment effectively uses the bi-linear filtering method (which is, in a broad sense, a texel interpolation method including the tri-linear filtering method or the like) for texture mapping to generate a defocused image. In other words, the defocused-image generating section 136 is to set the original image as a texture and to shift (or slide or move) the texture coordinates of an object (which is a virtual object having the same shape as that of a defocused area), for example, by a value smaller than one texel when the texture is mapped on the object through the bi-linear filtering method. Thus, the defocused image to be synthesized with the original image can be generated through a simple process in which the texture coordinates are only shifted.

The drawing section 140 is designed to draw an object viewable from the virtual camera within the object space, based on the object data, texture and so on.

The drawing section 140 comprises a texture mapping section 142, an alpha-synthesis section 144 and a hidden-surface removal section 146.

The texture mapping section 142 is designed to map a texture stored in a texture storage section 176 on an object (consisted of primitive faces such as polygons, free-form surfaces or the like) through the bi-linear filtering method (texel interpolation method) or a point sampling method.

The alpha-synthesis section 142 is designed to synthesize the original image with a defocused image generated by the defocused-image generating section 136, based on the alpha-value (or A-value) set for each pixel by the alpha-value setting section 134. For example, if the alpha-synthesis is the alpha-blending, the synthesis of the original image with the defocused image will be performed as represented by the following formulas:

$$R_Q=(1-\alpha) \times R_1 + \alpha \times R_2 \tag{1}$$

$$G_Q=(1-\alpha) \times G_1 + \alpha \times G_2 \tag{2}$$

$$B_Q=(1-\alpha) \times B_1 + \alpha \times B_2 \tag{3}$$

where $R_1$, $G_1$, $B_1$ are R, G and B color (or brightness) components in the original image which has previously been drawn in a frame buffer 174; $R_2$, $G_2$, $B_2$ are R, G and B color components in the defocused image generated by the defocused-image generating section 136; and $R_Q$, $G_Q$, $B_Q$ are output images generated through the alpha-blending.

The hidden-surface removal section 144 uses a Z buffer 178 (Z-plane) stored the Z-value (depth value) to erase the hidden surface according to the Z-buffer algorithm. This embodiment uses the function of the hidden-surface removal section 144 to update the alpha-value on drawing the virtual object.

The image generating system of this embodiment may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals interconnected through a network (transmission lien or communication line) may be used in the present invention.

2. Features of this Embodiment 2.1 Alpha($\alpha$)-synthesis

Figure 2:
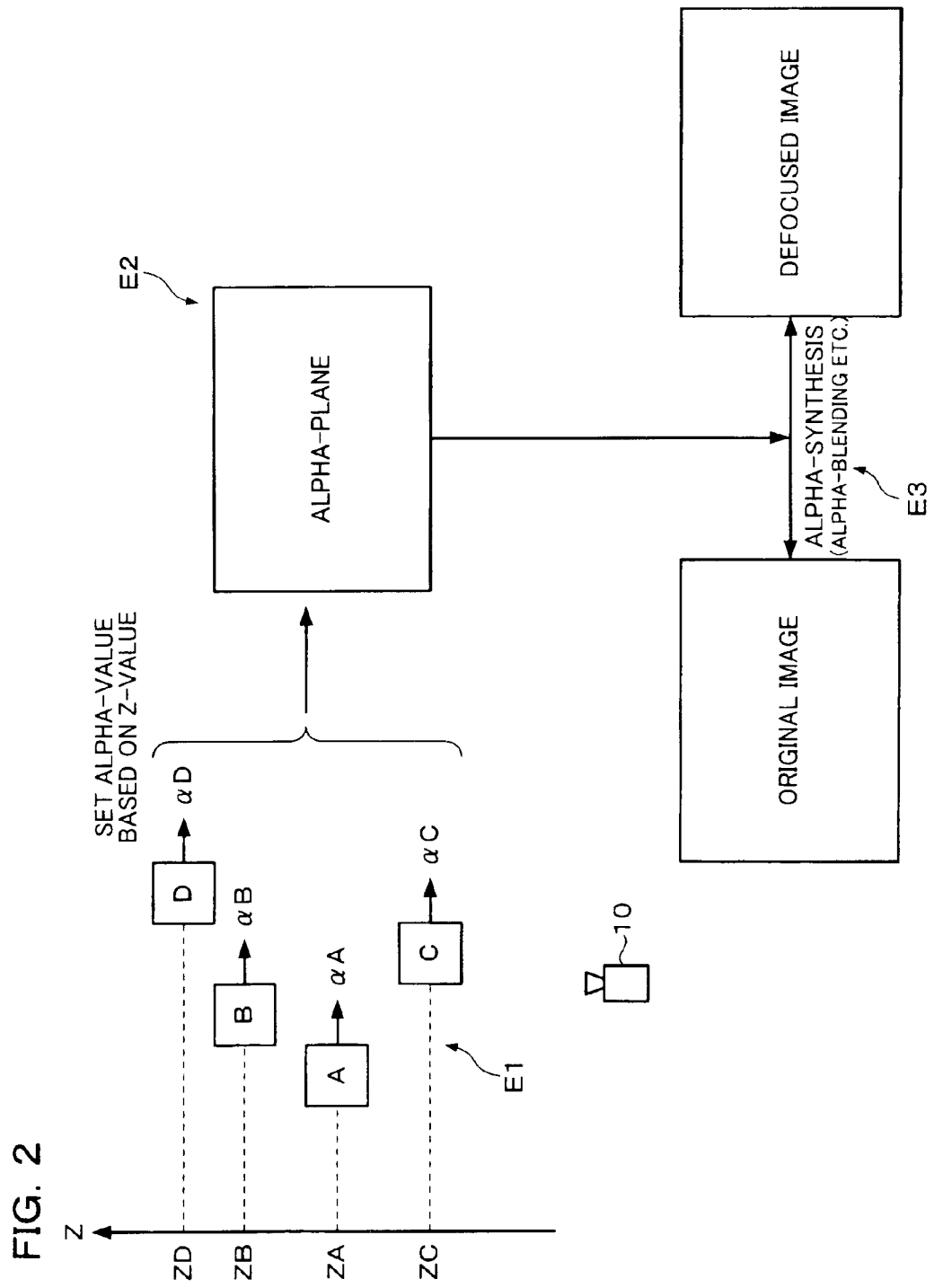
FIG. 2 illustrates a technique of setting an alpha-value corresponding to Z-value (depth value) and using the set alpha-value to synthesize a defocused image with an original image.

As shown by E1 in FIG. 2, this embodiment sets alpha-values $\alpha A$, $\alpha B$, $\alpha C$ and $\alpha D$ for the respective pixels A, B, C and D in an original image into values corresponding to the respective Z-values ZA, ZB, ZC and ZD in the pixels A, B, C and D to generate an alpha-plane (in which the alpha-value for each pixel is set) as shown by E2. More particularly, the alpha-value may increase close to 1.0 as a pixel is farther than the focus (or fixation point) of the virtual camera 10 (or as a pixel has its larger difference between the Z-values of that pixel and focus). Thus, the synthesis ratio of the defocused image increases as the pixel is farther than the focus of the virtual camera 10.

The Z-value may increase as the pixel is farther or closer to the virtual camera 10. The synthesis ratio of the defocused image may increase as the alpha-value approaches 1.0 (100%) or 0.0 (0%). In such a case, the aforementioned formulas (1), (2) and (3) will be used replacing $\alpha-1$ with $\alpha$.

In this embodiment, as shown by E3 in FIG. 2, the alpha-synthesis of the original image with the defocused image (e.g., alpha-blending or the like) is carried out based on the generated alpha-plane (which is, in a broad sense, alpha-value set for each pixel). FIGS. 3A and B show original and defocused images obtained through the alpha-synthesis.

When the alpha-synthesis of the original image with the defocused image is carried out based on the alpha-values set corresponding to the Z-values (or depth values) in such a manner, a so-called depth of field can be represented such that an image located farther than the focus of the virtual camera (which is set as a focused point) is generated as a more defocused image. Thus, a more real and natural image can be generated to be focused depending on the distance from the viewpoint as in the real world, unlike the game image of the prior art in which all the objects in the screen were focused. As a result, the virtual reality for players can highly be improved.

In addition, this embodiment does not require any calculation based on the positional relationship between each of the objects and the viewpoint. Therefore, the depth of field can be represented with reduced processing load. It is of course that such a calculation may be carried out in the present invention.

2.2 Alpha-value Setting

FIGS. 4A, 4B and FIGS. 5A, 5B illustrate the setting of alpha-values depending on the Z-values.

As shown in FIG. 4A, for example, areas AR0 to AR4 and AR1' to AR4' are sectionalized based on Z-values Z1 to Z4 and Z1' to Z4' (threshold values). alpha-values $\alpha 0$ to $\alpha 4$ and $\alpha 1'$ to $\alpha 4'$ are set to these areas AR0 to AR4 and AR1' to AR4'.

For example, an alpha-value $\alpha 1$ may be set for an pixel in the area AR1 between Z1 and Z2; another alpha-value $\alpha 2$ may be set for an pixel in the area AR2 between Z2 and Z3; still another alpha-value $\alpha 1'$ may be set for an pixel in the area AR1' between Z1' and Z2'; and a further alpha-value $\alpha 2'$ may be set for an pixel in the area AR2' between Z2' and Z3'.

The alpha-values set for the respective areas may be set based on the following relational expressions:

$$\alpha 0 < \alpha 1 < \alpha 2 < \alpha 3 < \alpha 4 \quad (4)$$

$$\alpha 0 < \alpha 1' < \alpha 2' < \alpha 3 ' < \alpha 4' \quad (5)$$

As will be apparent from these relational expressions (4) and (5), the alpha-value will increase as the pixel thereof is farther from the focus (or fixation point) of the virtual camera 10. If $\alpha$ is replaced by $\alpha-1$ in the relational expressions (1), (2) and (3), the alpha-value will reversely decrease as the pixel thereof is farther from the focus of the virtual camera 10. In other words, this embodiment sets the alpha-value such that the synthesis ratio of the defocused image increases as the difference between the focus of the virtual camera 10 and the Z-value increases.

Moreover, this embodiment variably controls the range of depth of field or defocusing effect by varying the corresponding relationship between the Z-value and alpha-value for each pixel.

For example, it is now assumed that a range in which the alpha-value becomes smaller than 1.0 (or the synthesis ratio of the defocused image becomes smaller than 100%) is defined to be a range of depth of field. Thus, the range of depth of field can be increased when the Z-value is coordinated with the alpha-value in such a manner as shown in FIG. 4A. On the other hand, the range of depth of field can be decreased when the Z-value is coordinated with the alpha-value in such a manner as shown in FIG. 4B.

The alpha-value specifying the boundary in the range of depth of field is not limited to 1.0, but may be optional.

If the Z-value is coordinated with the alpha-value as shown in FIG. 5A, the defocusing effect can be decreased while if the Z-value is coordinated with the alpha-value as shown in FIG. 5B, the defocusing effect can be increased. In other words, the alpha-values in the area AR2 (or AR2') between Z2 and Z3 (or between Z2' and Z3') are set to 0.4 (or decreased defocusing effect) in FIG. 5A while the alpha-values in the area AR2 (or AR2' ) are set to 0.7 (or increased defocusing effect) in FIG. 5B.

Figure 6A:
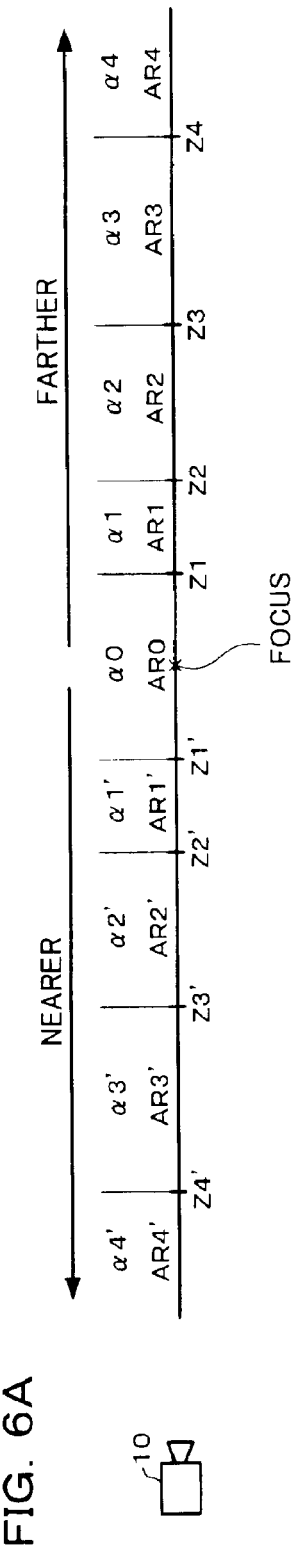
FIGS. 6A, 6B and 6C illustrate a technique of sectionalizing areas based on the Z-values to set an alpha-value for each of the sectionalized areas.
Figure 6B:
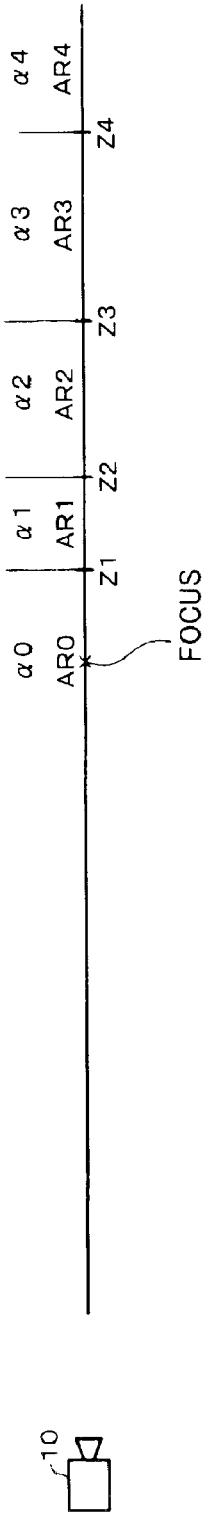
Figure 6C:
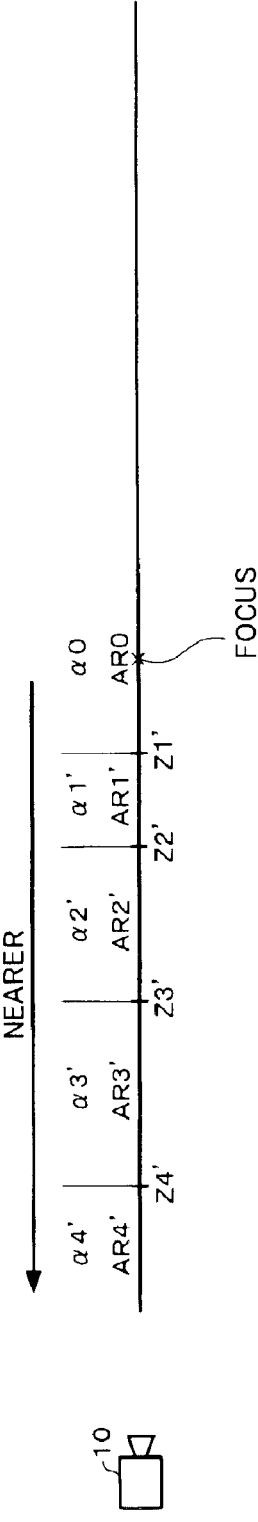

As shown in FIG. 6A, this embodiment performs the sectionalization of areas and the setting of alpha-value to the respective areas both on the farther and nearer sides to the focus. As shown in FIG. 6B, however, the sectionalization of areas and the setting of alpha-value to the respective areas may be carried out only on the farther side from the focus. Alternatively, as shown in FIG. 6C, the sectionalization of areas and the setting of alpha-value to the respective areas may be carried out only on the nearer side to the focus.

The setting of alpha-values as shown in FIGS. 6A, B and C can be realized through a technique which will be described in detail below.

Figure 7A:
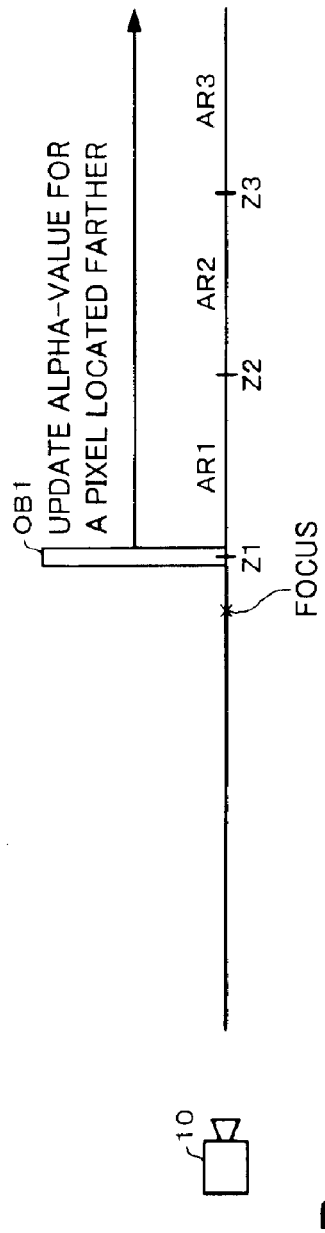
FIGS. 7A, 7B and 7C illustrate a technique of updating the alpha-value for a farther pixel in an object by drawing the object.

As shown in FIG. 7A, an object OB1 (polygon) having its Z-value set to Z1 is first drawn in a frame buffer (which is, in a broad sense, the drawing area in an original image) . The alpha-value for a pixel located on the farther side (which is, in abroad sense, the first direction including the nearer side) from the object OB1 is then updated. In other words, the hidden-surface removal process (or Z-butter process) based on the Z-value is effectively used to update the alpha-value for a pixel located farther from the object OB1.

Figure 7B:
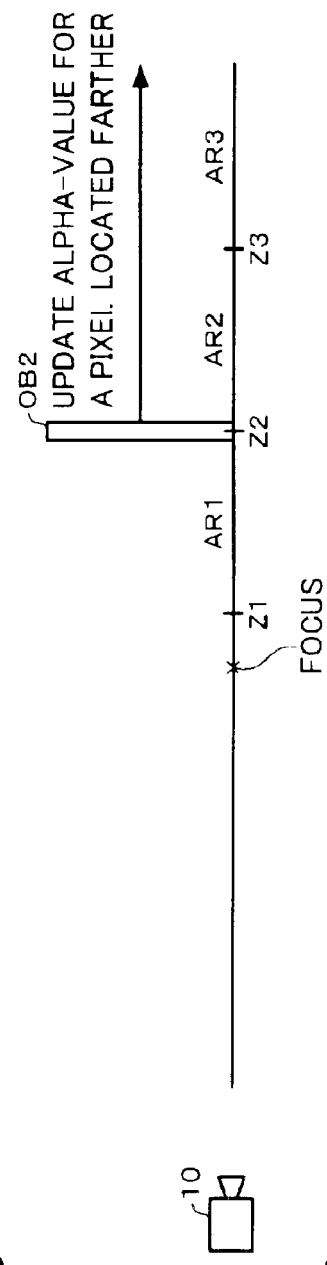
Figure 7C:
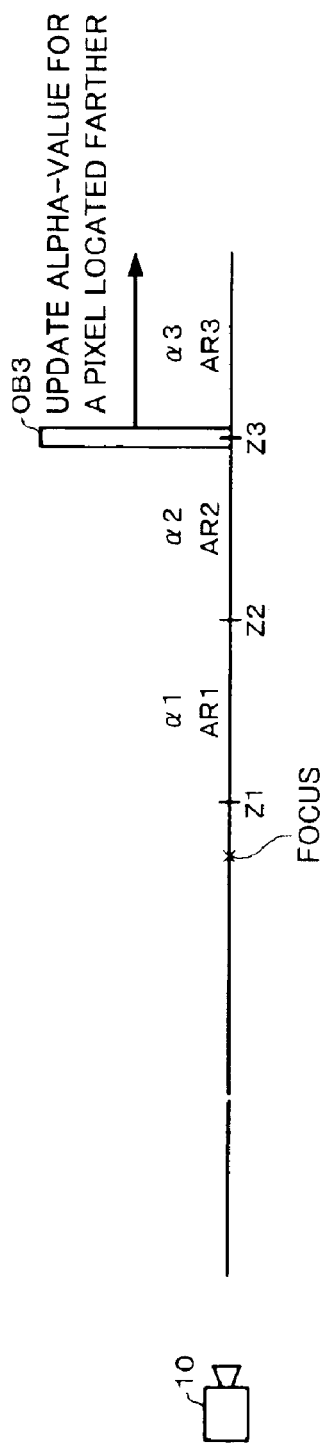

As shown in FIG. 7B, another object OB2 having its Z-value set to Z2 is then drawn in the frame buffer to update the alpha-value for a pixel located farther from the object OB2. Similarly, as shown in FIG. 7C, still another object OB3 having its Z-value set to Z3 is then drawn in the frame buffer to update the alpha-value for a pixel located farther from the object OB3.

By using such a technique, the alpha-values for the pixels in the areas AR1, AR2 and AR3 can be set to $\alpha 1$, $\alpha 2$ and $\alpha 3$, respectively.

And yet, such a technique provides an advantage that the alpha-values can automatically be updated through the hidden-surface removal function using the Z-buffer only by drawing the objects on the frame buffer in which the original image had been drawn. This enables the desired alpha-value to be set to the corresponding pixel in each area with substantially reduced processing load.

FIGS. 8A to 9D illustrate the more details of the alpha-value (or alpha-plane) setting technique.

Figure 8A:
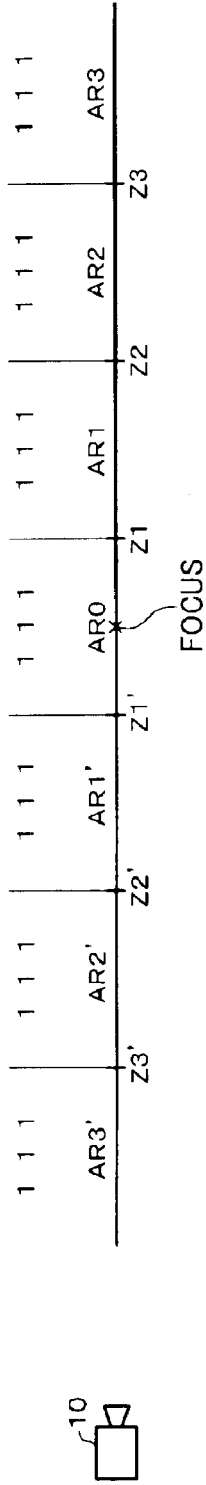
FIGS. 8A, 8B and 8C illustrate the details of another alpha-value updating technique.

As shown in FIG. 8A, the alpha-values in all the areas AR0 to AR3 and AR1' to AR3' are first initialized, for example, to (111) (where the alpha-values being of 3 bits).

Figure 8B:
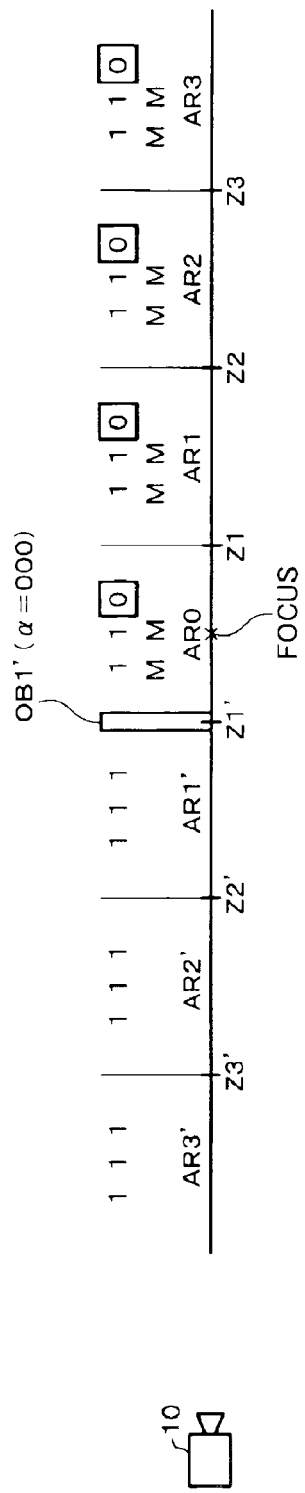

As shown in FIG. 8B, the Z-value is then set to Z1' and an object OB1' (near) having its alpha-value set, for example, to (000) is drawn in the frame buffer. Thus, the first bit of the alpha-value for a pixel located farther from of or nearer to the object OB1' (which is, in a broad sense, the first direction) is updated, for example, to 0 (which is, in a broad sense, first level). In such a case, however, the bits other than the first bit (or bit to be updated) are masked.

Figure 8C:
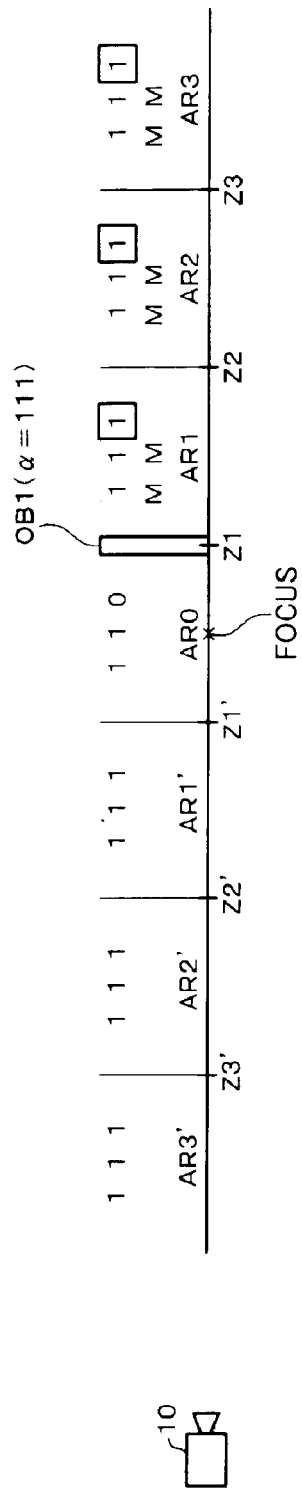

As shown in FIG. 8C, the Z-value is then set to Z1 and an object OB1 having its alpha-value set, for example, to (111) is drawn in the frame buffer. Thus, the first bit of the alpha-value for a pixel located farther from the object OB1 (far) is updated, for example, to 1 (which is, in a broad sense, second level). In such a case, however, the bits other than the first bit are also masked.

In such a manner, the alpha-value in the area AR0 is set to (110) while the alpha-values in the other areas are set to (111). Namely, the alpha-value set in the area AR0 can be different from the alpha-values in the other areas.

As shown in FIG. 9A, an object OB2' having its alpha-value=(000) is then drawn at Z=Z2' to update the second bit of the alpha-value for a pixel located farther from the object OB2' to 0 (with the bits other than the second bit being masked).

As shown in FIG. 9B, an object OB2 having its alpha-value=(111) is then drawn at Z=Z2 to update the second bit of the alpha-value for a pixel located farther from the object OB2 to 1 (with the bits other than the second bit being masked).

In such a manner, the alpha-value in the area AR0 is set to (100); the alpha-values in the areas AR1' and AR1 are set to (101); and the alpha-values in the other areas are set to (111).

As shown in FIG. 9C, an object OB3' having its alpha-value=(000) is then drawn at Z=Z3' to update the third bit of the alpha-value for a pixel located farther from the object OB3' to 0 (with the bits other than the third bit being masked).

As shown in FIG. 9D, an object OB3 having its alpha-value=(111) is then drawn at Z=Z3 to update the third bit of the alpha-value for a pixel located farther from the object OB3 to 1 (with the bits other than the third bit being masked).

In such a manner, the alpha-value in the area AR0 is set to (000); the alpha-values in the areas AR1' and AR1 are set to (001); the alpha-values in the areas AR2' and AR2 are set to (001); and the alpha-values in the areas AR3' and AR3 are set to (111).

Namely, a pixel having its increased difference of Z-value relative to the focus of the virtual camera 10 will be set to be increased in alpha-value, thus resulting in increase of the synthesis ratio of the defocused image. Therefore, the alpha-value optimum to the representation of the depth of field can be realized through a simple and high-speed process in which the objects are only drawn masking the particular bits.

There has described the updating of the alpha-value for a pixel located farther from an object merely by drawing that object. However, if the image generating system has a function of updating the alpha-value for a pixel located nearer to an object by drawing that object or a function of inverting the Z-value, the alpha-value for a pixel located nearer to the object may be updated by drawing the object.

2.3 Generation of Defocused Image

This embodiment effectively uses the bi-linear filtering method (or texel interpolation method) for texture mapping to generate the defocused image (FIG. 3B) to be synthesized with the original image (FIG. 3A).

In the texture mapping, the position of a pixel may be offset from the position of a texel.

Figure 10:
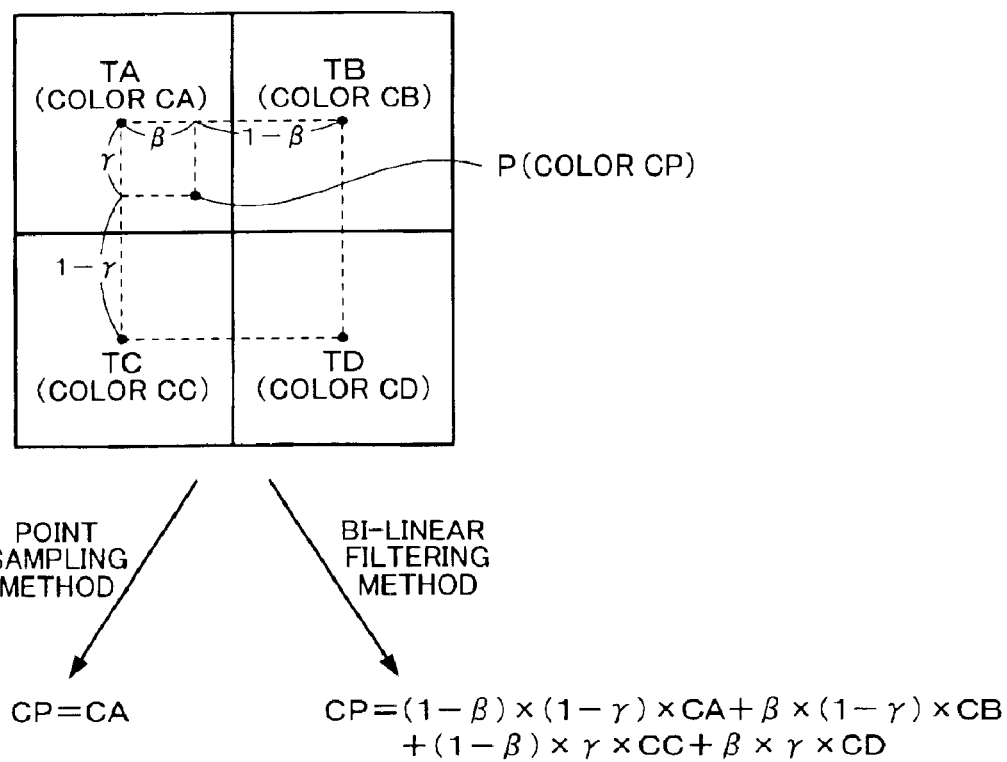
FIG. 10 illustrates the texture mapping in the bi-linear filtering method.

In such a case, the point sampling method is such that a color CP (which is, in a broad sense, image information) at a pixel (or sampling point) P becomes a color CA at a texel TA nearest to the point P, as shown in FIG. 10.

On the other hand, the bi-linear filtering method is such that the color CP at the point P becomes a color obtained by interpolating colors CA, CB, CC and CD at texels TA, TB, TC and TD around the point P.

More particularly, a coordinate ratio $\beta$: $1-\beta$ ($0 \leq \beta \leq 1$) in the X-axis direction and a coordinate ratio $\gamma$: $1-\gamma$ ($0 \leq \gamma \leq 1$) in the Y-axis direction are determined based on the coordinates of TA to TD and the coordinates of P.

In this case, the color CP (or output color through the bi-linear filtering method) at P can be represented by the following formula:

$$CP = (1-\beta) \times (1-\gamma) \times CA + \beta \times (1-\gamma) \times CB + \\ (1-\beta) \times \gamma \times CC + \beta \times \gamma \times CD \quad (6)$$

For generating the defocused image, this embodiment aims to the fact that the bi-linear filtering method automatically interpolates the color in such a manner.

Figure 11:
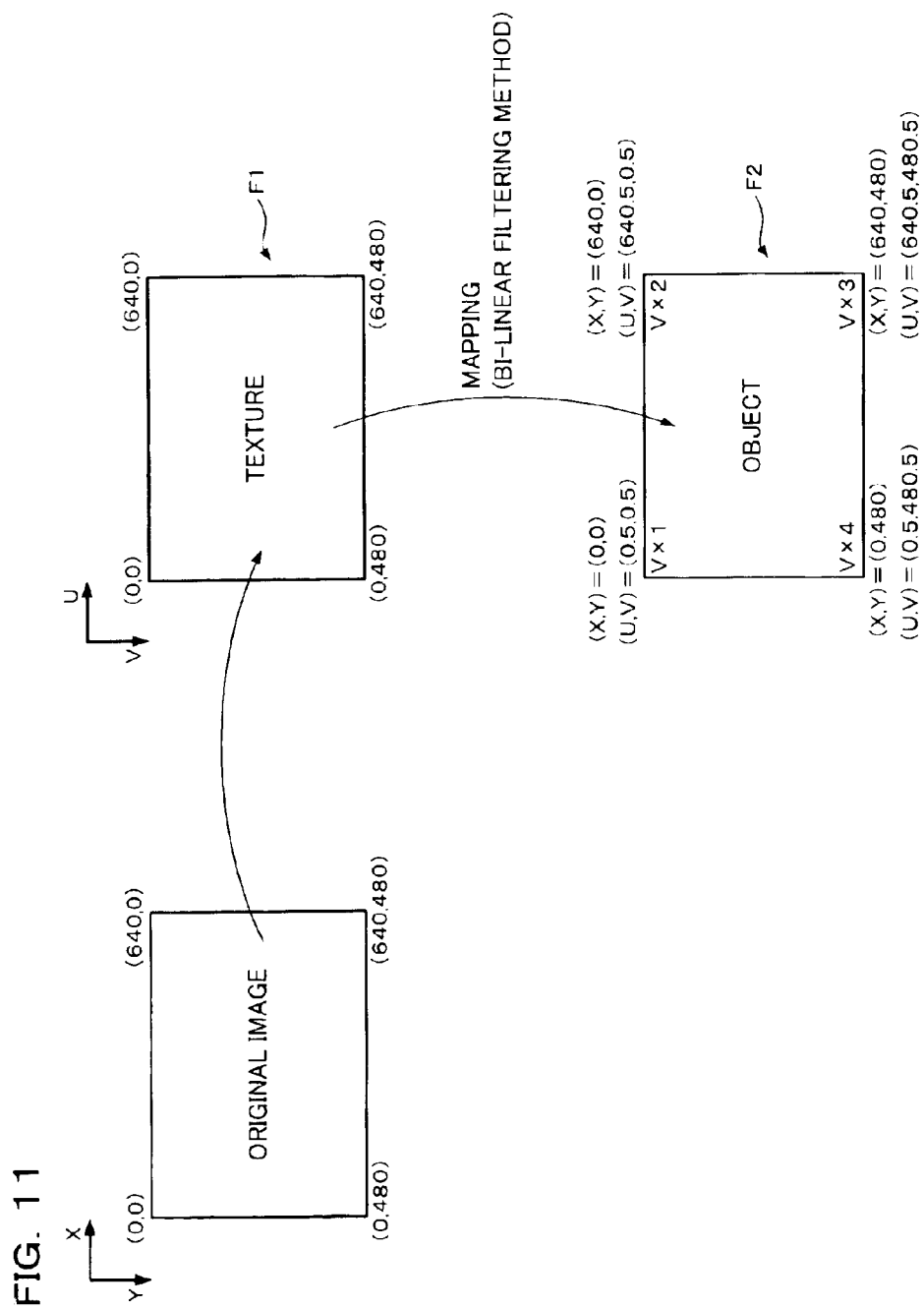
FIG. 11 illustrates a technique of generating a defocused image by effectively using the bi-linear filtering method.

More particularly, as shown by F1 in FIG. 11, an original image drawn, for example, in the frame buffer is set as a texture. When this texture (or original image) is to be mapped on an object through the bi-linear filtering method, the texture coordinates for each vertex in the object are shifted (or slid or moved) in the rightward and downward direction, for example, by (0.5, 0.5). Thus, a defocused image in which the pixel colors in the original image spread the surrounding area can be generated automatically through the interpolation in the bi-linear filtering method.

Where it is desired to defocus the entire scene, the shape of an object on which the texture (or original image) is mapped is set to be identical with that of the scene (defocused area) In other words, if the vertex coordinates of the scene are (X, Y)=(0, 0), (640, 0), (640, 480) and (0, 480), the vertex coordinates in the object are also (X, Y)=(0, 0), (640, 0), (640, 480) and (0, 480).

If in such a case, texture coordinates (U, V) provided to the vertexes VX1, VX2, VX3 and VX4 of an object are set to be respectively (0, 0), (640, 0), (640, 480) and (0, 480), the positions of the scene pixels coincide with the texel positions of a texture. Therefore, the image will not be defocused.

On the contrary, if the texture coordinates (U, V) provided to the vertexes VX1, VX2, VX3 and VX4 of the object are set to be respectively (0.5, 0.5), (640.5, 0.5), (640.5, 480.5) and (0.5, 480.5), the positions of the scene pixels will offset from the texel positions of a texture. Therefore, the image will be viewed defocused by color interpolation through the interpolation of the bi-linear filtering method.

If it is desired to defocus only part of the scene, the shape of the object may be identical with that of the defocused area.

Figure 12:
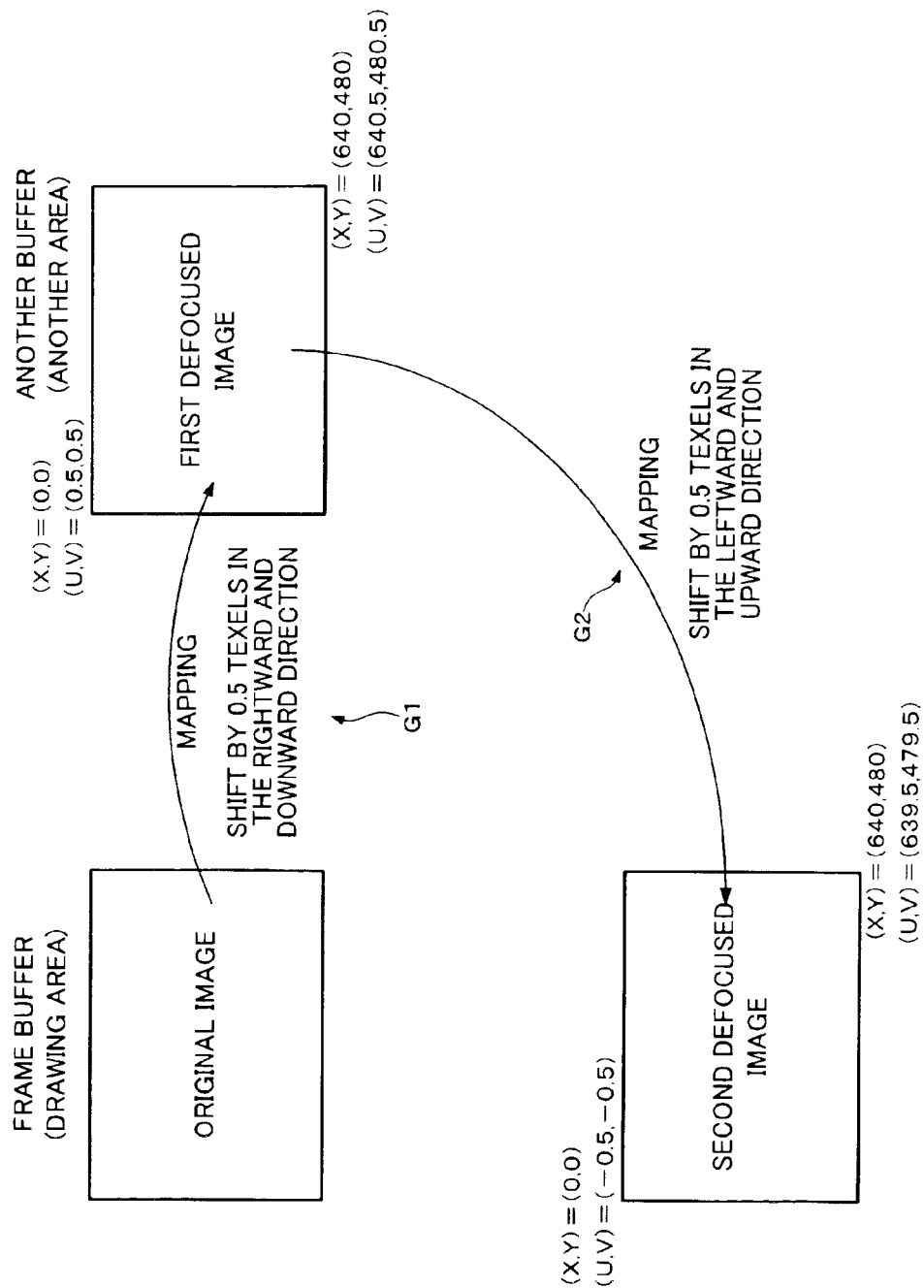
FIG. 12 illustrates another technique of generating a defocused image by effectively using the bi-linear filtering method.

As shown by G1 in FIG. 12, this embodiment sets the original image as a texture and then shifts it, for example, in the rightward and downward direction (or first shift direction) by 0.5 texel. Thus, the texture mapping is performed through the bi-linear filtering method to generate a first defocused image. As shown by G2 in FIG. 12, the first defocused image is then set as a texture and shifts it, for example, in the leftward and upward direction (or second shift direction) by 0.5 texel. Thus, the texture mapping is performed through the bi-linear filtering method to generate a second defocused image. Alternatively, a plurality of such processes (shifts in the rightward and downward direction and in the leftward and upward direction) maybe repeated. Thus, a natural defocused image can be generated.

The principle of generating a defocused image through the interpolation of the bi-linear filtering method will be described below.

Figure 13A:
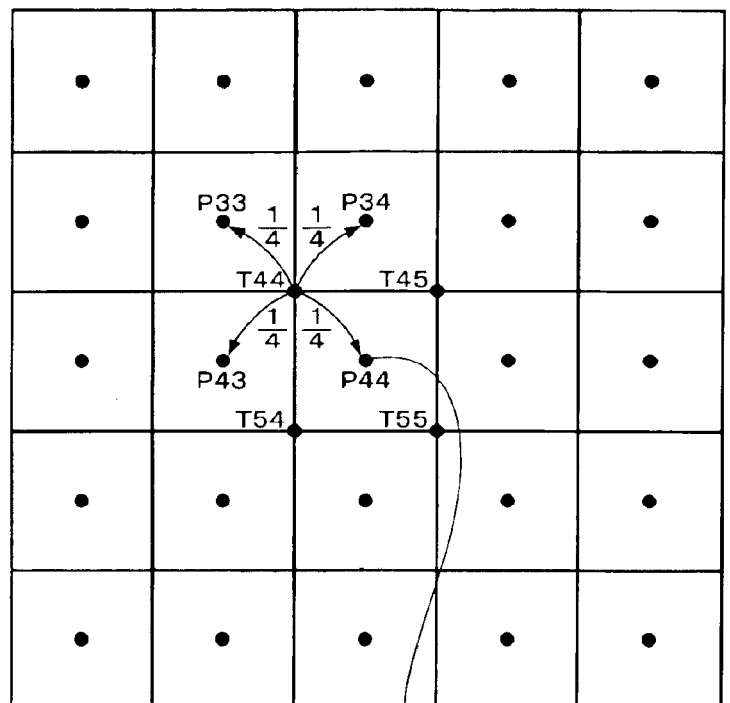
FIGS. 13A and 13B illustrate a principle of generating a more defocused image through the interpolation in the bi-linear filtering method.

It is now assumed that the texture coordinates have been shifted in the rightward and downward direction by 0.5 texels and the texture mapping has been carried out through the bi-linear filtering method, as shown in FIG. 13A. In this case, $\beta=\gamma=\frac{1}{2}$ in the above formula (6). Thus, if it is assumed that texels T44, T45, T54 and T55 have their colors C44, C45, C54 and C55, the color CP44 of a pixel P44 is represented by:

$$CP44 = (C44+C45+C54+C55)/4 \quad (7).$$

As will be seen from the foregoing, the transformation shown in FIG. 13A will cause the color C44 of the texel T44 (which corresponds to the original color in the pixel P44 of the original not-transformed image) to spread to the surrounding pixels P33, P34, P43 and P44 each by ¼.

Figure 13B:
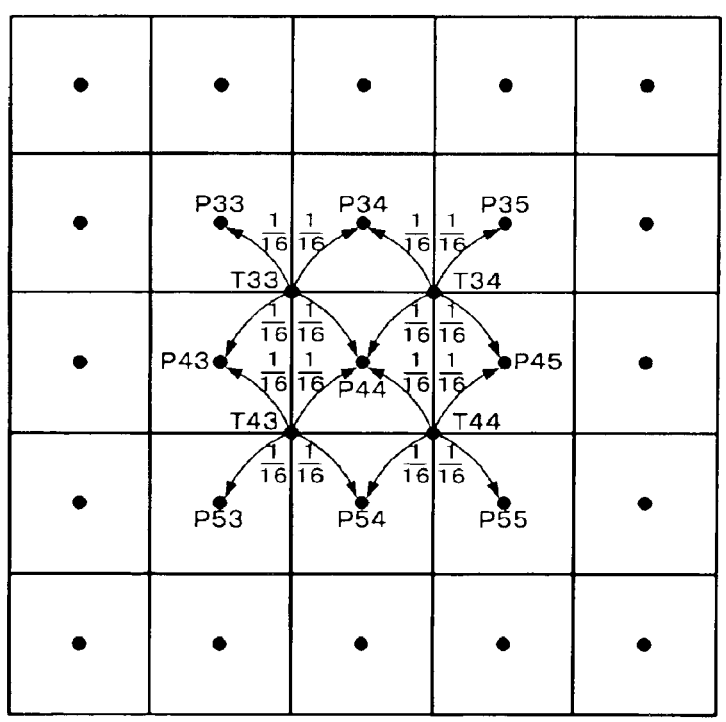

It is thereafter assumed that the image obtained in FIG. 13A is used as a texture and that the texture mapping is carried out through the bi-linear filtering method after the texture coordinates thereof have been shifted in the leftward and upward direction by 0.5 texels, as shown in FIG. 13B. In this case, the pixels P33, P34, P43 and P44 of FIG. 13A will correspond to the texels T33, T34, T43 and T44 of FIG. 13B, respectively. Thus, the color C44, which has spread to the pixels P33, P34, P43 and P44 (T33, T34, T43 and T44) each by ¼ in FIG. 3A, will further spread to the four surrounding pixels each by ¼. As a result, the color C44 of the original texel T44 will spread to the surrounding pixels by 1/16=¼×¼.

Therefore, the transformations of FIGS. 13A and B will cause the color C44 (which corresponds to the original color of the pixel P44 in the original image drawn in the frame buffer) to spread to the pixels P33, P34 and P35 by 1/16, 2/16 and 1/16, respectively. Moreover, the color C44 will spread to the pixels P43, P44 and P45 by 2/16, 4/16 and 2/16, respectively. The color C44 will spread to the pixels P53, P54 and P55 by 1/16, 2/16 and 1/16, respectively.

As a result, the transformations of FIGS. 13A and B will apply such a plane filter as shown in FIG. 14A to the original image. This plane filter can generate an ideal defocused image for the original image by uniformly spreading the colors of the respective pixels in the original image to the surrounding pixels.

If the transformations of FIGS. 13A and B are twice repeated as a set, such a plane filter as shown in FIG. 14B will be applied to the original image. Such a plane filter can generate a more ideal defocused image than that of FIG. 14A.

3. Process of this Embodiment

The detailed process of this embodiment will be described in connection with the flowcharts of FIGS. 15 and 16.

The original image (or perspectively transformed image) is first drawn in the frame buffer (step S1). The technique as described in connection with FIGS. 8A to 9D is then used to prepare an alpha-plane (or alpha-channel) (step S2). Then j is initialized to 0 (step S3).

Subsequently, as shown by G1 in FIG. 12, the original image in the frame buffer is then set as a texture which is in turn mapped on a another buffer (step S4). At this time, the mapping is carried out through the bi-linear filtering method after the texture coordinates have been shifted by (0.5, 0.5).

Subsequently, as shown by G2 in FIG. 12, the image in the other buffer is set as a texture which is in turn mapped onto the frame buffer (step S5). At this time, the mapping is carried out through the bi-linear filtering method after the texture coordinates have been shifted by (−0.5, −0.5). At the same time, as shown by E3 in FIG. 2, the alpha-plane generated at the step S2 is used to perform the alpha-blending between the original image (FIG. 3A) and the defocused image (FIG. 3B).

Then j is incremented by one (step S6). It is judged whether or not j exceeds M (the number of repeated defocusing transformations) (step S7). If not so, the procedure returns to the step S4. If the j exceeds the M, the procedure is terminated.

Figure 15:
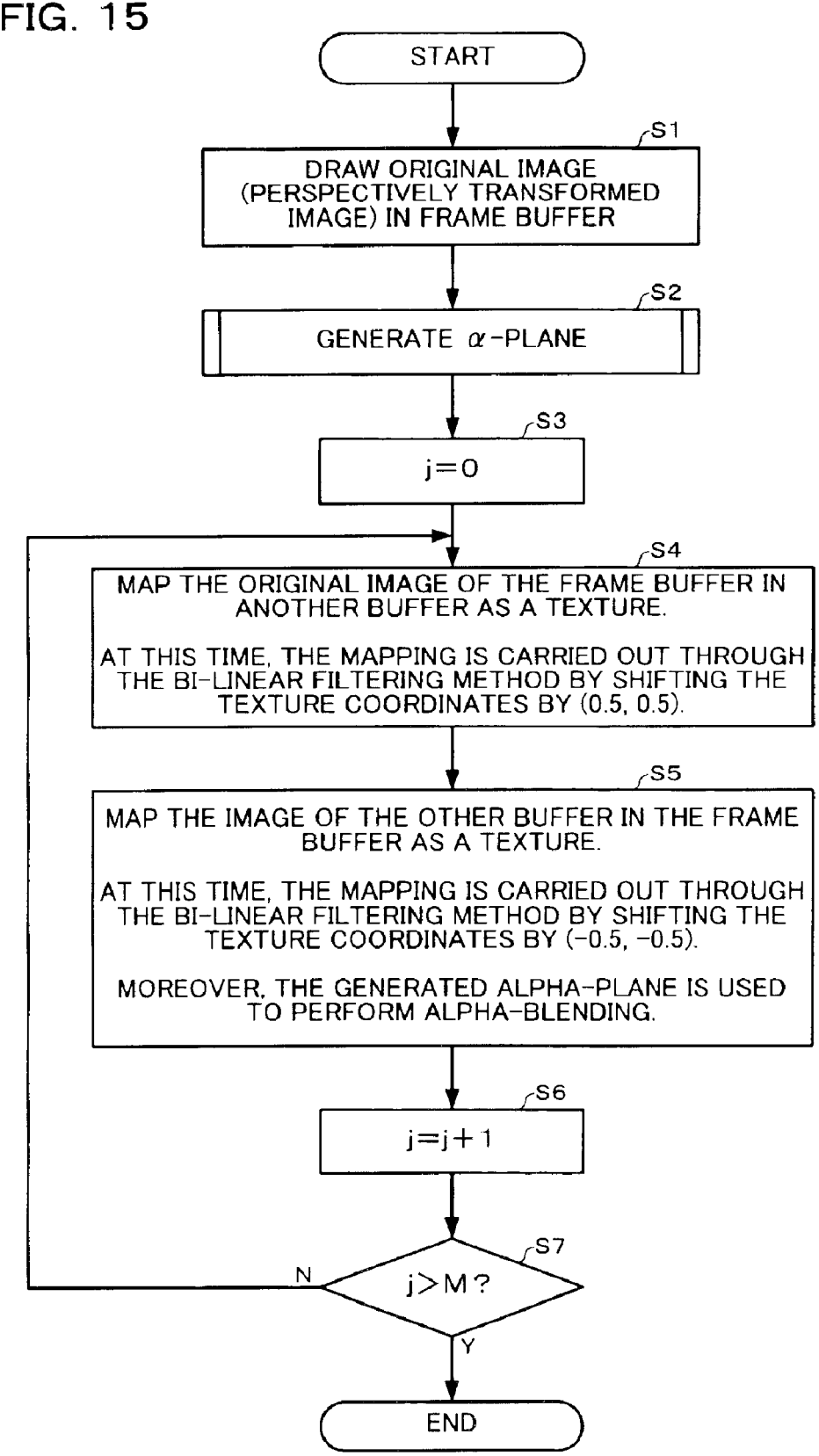
FIG. 15 is a flowchart illustrating the details of a process in this embodiment.
Figure 16:
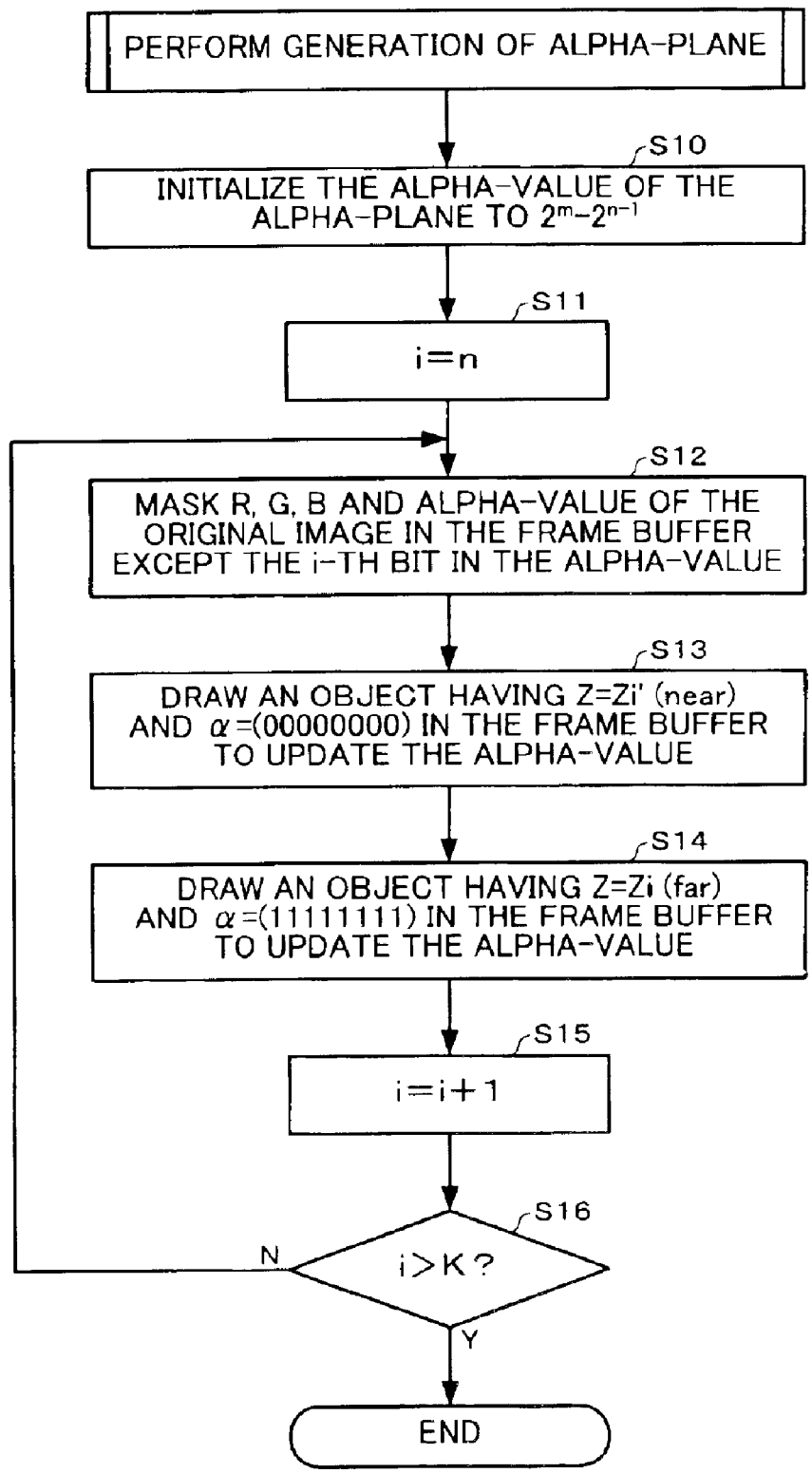
FIG. 16 is a flowchart illustrating the details of an alpha-plane generating process.

FIG. 16 is a detailed flowchart of generating the alpha-plane shown in FIG. 15.

As described in connection with FIG. 8A, all the alpha-values in the alpha-plane are initialized with $2^m-2^{n-1}$ (step S10). Then i is initialized to n (step S11).

Symbols m and n used herein represent the maximum and minimum bits in the prepared alpha-plane, respectively. For example, if the alpha-value is 8 bits and m and n are respectively equal to 6 and 4, the alpha-value of the alpha-plane is initialized to (00111000) at the step S10. In other words, the initialization at the step S10 will initialize the alpha-value so that all the m–n bits are made one (1) with the other bits being made zero (0).

All the R, G, B and alpha-values of the original image in the frame buffer are then masked except the i-th bit in the alpha-value (step S12). As described in connection with FIG. 8B, an object (or polygon) having Z=Zi' (near) and α=(00000000) is then drawn in the frame buffer to update the alpha-value of a pixel located farther from that object (step S13). As described in connection with FIG. 8C, another object having Z=Zi (far) and α=(11111111) is then drawn in the frame buffer to update the alpha-value of a pixel located farther from that object (step S14).

Then i is incremented by one (step S15). It is then judged whether or not i exceeds K (step S16). If not so, the procedure returns to the step S12. If i exceeds K, the process of preparing the alpha-plane is terminated.

4. Hardware Arrangement

Figure 17:
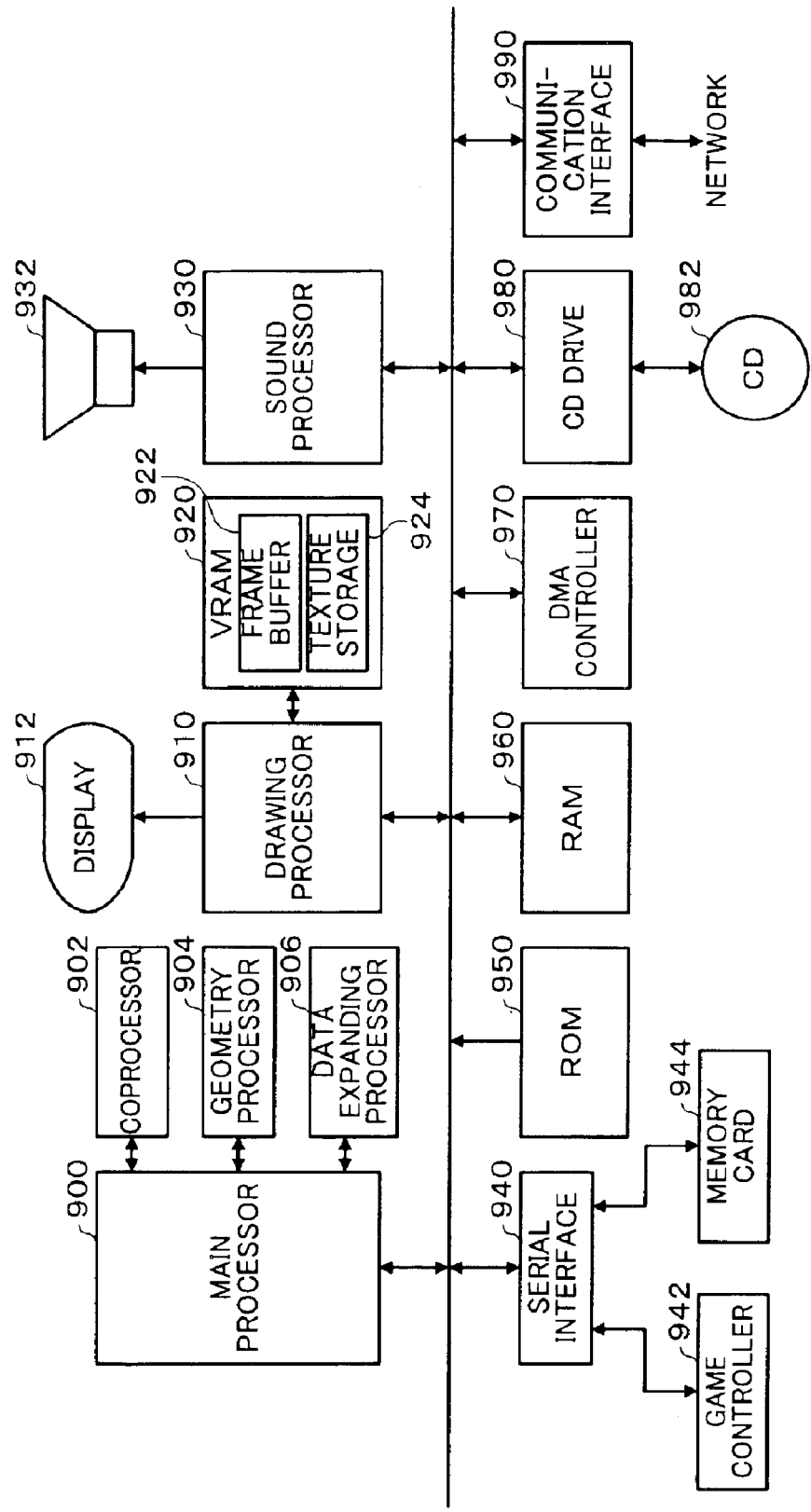
FIG. 17 is a hardware arrangement which can realize this embodiment.

A hardware arrangement which can realize this embodiment is shown in FIG. 17.

A main processor 900 operates to execute various processings such as game processing, image processing, sound processing and other processings according to a program stored in a CD (information storage medium) 982, a program transferred through a communication interface 990 or a program stored in a ROM (information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, the program running on the main processor 900 instructs (or asks) that processing to the coprocessor 902.

A geometry processor 904 is to perform a geometry processing such as coordinate transformation, perspective transformation, light source calculation, curve formation or the like and has a product-sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expanding processor 906 is to perform a decoding process for expanding image and sound compressed data or a process for accelerating the decoding process in the main processor 900. In the opening, intermission, ending or game scene, thus, an MPEG compressed animation may be displayed. The image and sound data to be decoded may be stored in the storage devices including ROM 950 and CD 982 or may externally be transferred through the communication interface 990.

A drawing processor 910 is to draw or render an object constructed by primitive faces such as polygons or curved faces at high speed. On drawing the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing a hidden-surface removal by the use of a Z-buffer or the like, based on the object data and texture. The drawing processor 910 can also perform alpha-blending (or translucency processing), depth cueing, mip-mapping, fogging, bi-linear filtering, tri-linear filtering, anti-aliasing, shading and soon. As the image for one frame is written into the frame buffer 922, that image is displayed on a display 912.

A sound processor 930 includes any multi-channel ADPCM sound source or the like to generate high-quality game sounds such as BGMs, sound effects and voices. The generated game sounds are outputted from a speaker 932.

The operational data from a game controller 942, saved data from a memory card 944 and personal data may externally be transferred through a serial interface 940.

ROM 950 has stored a systemprogram and soon. For an arcade game system, the ROM 950 functions as an information storage medium in which various programs have been stored. The ROM 950 may be replaced by any suitable hard disk.

RAM 960 is used as a working area for various processors.

The DMA controller 970 controls the DMA transfer among processors and memories (such as RAM, VRAM and ROM).

The CD drive 980 drives a CD (information storage medium) 982 in which the programs, image data or sound data have been stored and enables these programs and data to be accessed.

The communication interface 990 is to perform data transfer between the image generating system and any external instrument through a network. In such a case, the network connectable with the communication interface 990 may take any of communication lines (analog phone line or ISDN) or high-speed serial interface bus. The use of the communication line enables the data transfer to be performed through the INTERNET. If the high-speed serial interface bus is used, the data transfer may be carried out between the image generating system and any other image generating system or any other game system.

All the means of the present invention may be executed only through hardware or only through a program which has been stored in an information storage medium or which is distributed through the communication interface. Alternatively, they may be executed both through the hardware and program.

If all the means of the present invention are executed both through the hardware and program, the information storage medium will have stored a program for realizing (or executing) the means of the present invention through the hardware. More particularly, the aforementioned program instructs the respective processors 902, 904, 906, 910 and 930 which are hardware and also delivers the data to them, if necessary. Each of the processors 902, 904, 906, 910 and 930 will execute the corresponding one of the means of the present invention based on the instruction and delivered data.

Figure 18A:
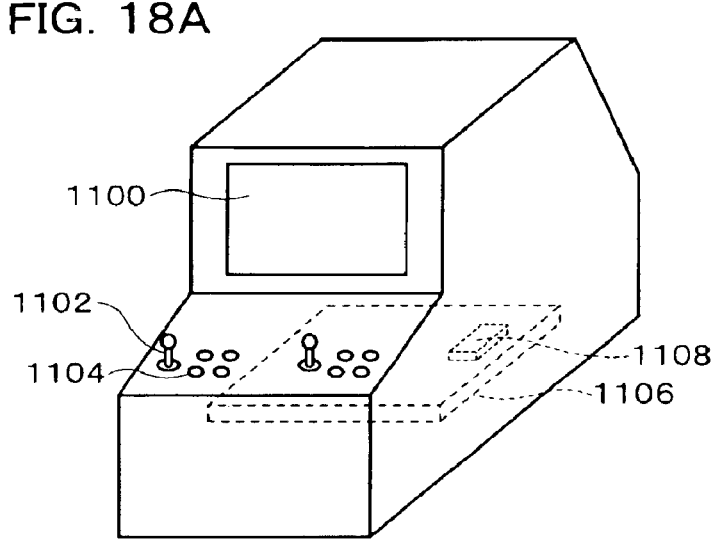
FIGS. 18A, 18B and 18C show various system configurations to which this embodiment can be applied.

FIG. 18A shows an arcade game system to which this embodiment is applied. Players enjoy a game by controlling levers 1102 and buttons 1104 while viewing a game scene displayed on a display 1100. A system board (circuit board) 1106 included in the game system includes various processor and memories which are mounted thereon. Information (program or data) for realizing all the means of the present invention has been stored in a memory 1108 on the system board 1106, which is an information storage medium. Such information will be referred to "stored information" later.

Figure 18B:
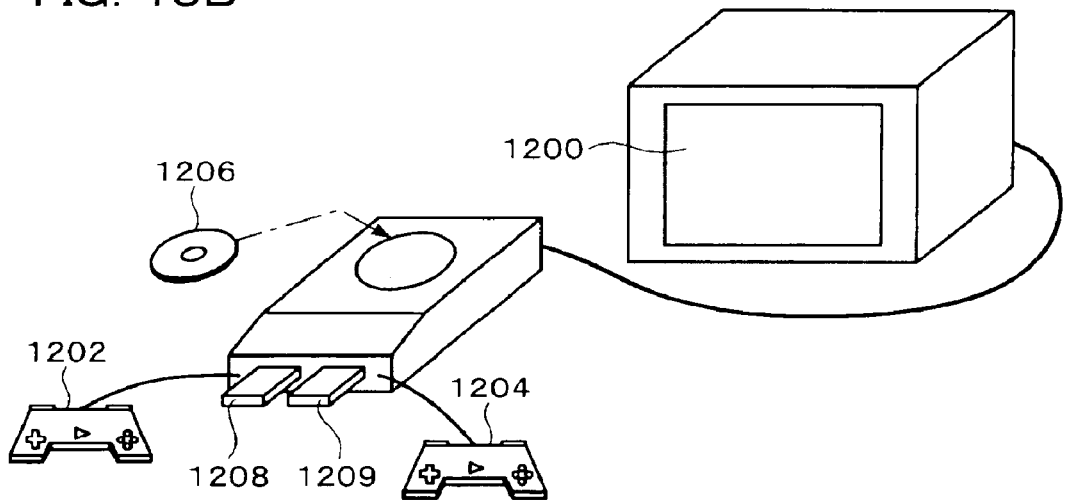

FIG. 18B shows a home game apparatus to which this embodiment is applied. A player enjoys a game by manipulating game controllers 1202 and 1204 while viewing a game picture displayed on a display 1200. In such a case, the aforementioned stored information pieces have been stored in DVD 1206 and memory cards 1208, 1209 which are detachable information storage media in the game system body.

Figure 18C:
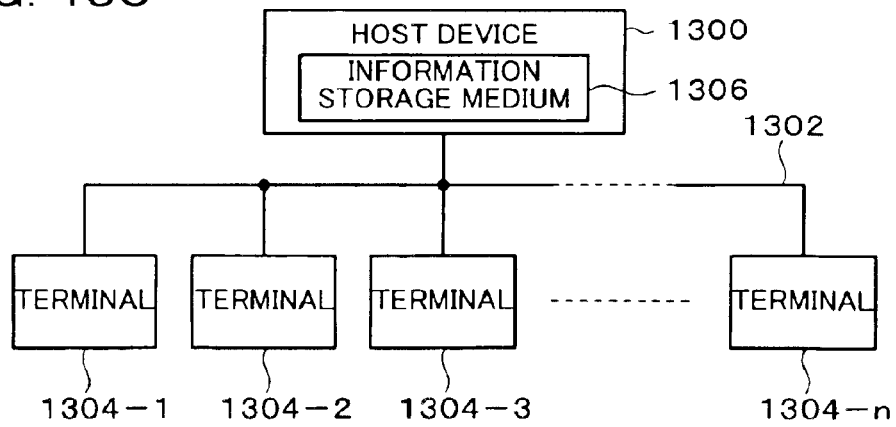

FIG. 18C shows an example wherein this embodiment is applied to a game system which includes a host device 1300 and terminals 1304-1 to 1304-n connected to the host device 1300 through a network (which is a small-scale network such as LAN or a global network such as INTERNET) 1302. In such a case, the above stored information pieces have been stored in an information storage medium 1306 such as magnetic disk device, magnetic tape device, semiconductor memory or the like which can be controlled by the host device 1300, for example. If each of the terminals 1304-1 to 1304-n are designed to generate game images and game sounds in a stand-alone manner, the host device 1300 delivers the game program and other data for generating game images and game sounds to the terminals 1304-1 to 1304-n. On the other hand, if the game images and sounds cannot be generated by the terminals in the stand-alone manner, the host device 1300 will generate the game images and sounds which are in turn transmitted to the terminals 1304-1 to 1304-n.

In the arrangement of FIG. 18C, the means of the present invention may be decentralized into the host device (or server) and terminals. The above information pieces for realizing the respective means of the present invention may be distributed and stored into the information storage media of the host device (or server) and terminals.

Each of the terminals connected to the network may be either of home or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above forms, but may be carried out in any of various other forms.

For example, the invention relating to one of the dependent claims may not contain part of the structural requirements in any claim to which the one dependent claim belongs. The primary part of the invention defined by one of the independent claim may be belonged to any other independent claim.

It is desirable that the setting of alpha-value is carried out through such a technique as described in connection with FIGS. 6A to 9D. However, the present invention is not limited to such a technique. For example, the alpha-value may continuously be varied depending on the change of the depth value (Z-value), rather than the stepwise manner.

Although it is desirable that the defocused image to be synthesized with the original image is generated through such a technique as described in connection with FIGS. 11 and 12, the present invention is not limited to such a technique. For example, the defocused image may be generated by synthesizing the original image with an image obtained by offsetting the original image or by synthesizing an original image in one frame with another original image in the previous frame.

In the invention in which the alpha-value is set as in FIGS. 6A to 9D, the set alpha-value may be utilized to various other image drawings, rather than the synthesis between the original image and the defocused image. For example, the set alpha-value may be used to make an object located farther than the viewpoint translucent so that it will merge into the background.

The invention in which the defocused image is generated through the texel interpolation method is not limited to such a technique as described in connection with FIGS. 11 to 14B. For example, rather than defocusing of the entire scene, a defocused area smaller than the scene may be set to defocus the original image in that area.

Although this embodiment has been described as to the object located farther than the viewpoint being increased in depth value, the present invention is not limited to this. For example, the present invention may similarly be applied to the object located farther than the viewpoint being decreased in depth value.

The present invention may be applied to any of various games such as fighting games, shooting games, robot combat games, sports games, competitive games, roll-playing games, music playing games, dancing games and so on.

Furthermore, the present invention can be applied to various image generating systems such as arcade game systems, home game systems, large-scaled multi-player attraction systems, simulators, multimedia terminals, game image generating system boards and so on.

What is claimed is:

1. An image generating system for generating an image, comprising:

a memory which stores a program and data for image generating; and at least one processor which is coupled with the memory and performs processing for image generating, the processor including:

an alpha-value setting section which sets an alpha-value for each pixel to a value corresponding to a depth value of the each pixel in an original image, wherein the value is not associated with color information; and a synthesizing section which synthesizes the original image with a defocused image corresponding to the original image based on the alpha-value set for each pixel, wherein the alpha-value setting section sets the alpha-value for the each pixel so that a synthesis ratio of the defocused image becomes higher for a pixel having a larger difference between a focal depth value of a virtual camera and the depth value of the each pixel.

2. The image generating system according to claim 1, wherein a range of depth of field or magnitude of defocusing effect is variably controlled by varying a corresponding relationship between the depth value of the each pixel and the alpha-value.

3. The image generating system according to claim 1, wherein the alpha-value setting section sets an alpha-value for a pixel having a depth value located in an area AR1 between Z1 and Z2 as α1, the alpha-value for a pixel having a depth value located in an area AR2 between Z2 and Z3 as α2, . . . , and subsequently the alpha-value for a pixel having a depth value located in an area ARi between Zi and Zi+1 as αi; and wherein the image generating system further comprises a drawing section which draws an image based on the alpha-value set by the alpha-value setting section.

4. The image generating system according to claim 3, wherein the alpha-value setting section updates:

the alpha-value of an pixel located in a first direction from an object OB1 having the depth value set as Z1 by drawing the object OB1 in a drawing area of an original image;

the alpha-value of an pixel located in the first direction from an object OB2 having the depth value set as Z2 by drawing the object OB2 in the drawing area of the original image; . . . and subsequently the alpha-value of an pixel located in the first direction from an object OBi having the depth value set as Zi by drawing the object OBi in the drawing area of the original image.

5. The image generating system according to claim 4, wherein the alpha-value setting section updates only a bit to be updated by masking a bit not to be updated when an object is drawn in the drawing area of the original image to update the alpha-value.

6. The image generating system according to claim 3, wherein the alpha-value setting section updates:

an n-th bit in the alpha-value of a pixel located in a first direction from an object OB1' having the depth value set as Z1' into a first level by drawing the object OB1' in a drawing area of an original image, and the n-th bit in the alpha-value of a pixel located in the first direction from an object OB1 having the depth value set as Z1 and located in the first direction from the object OB1' into a second level by drawing the object OB1 in the drawing area of the original image;

an (n+1)-th bit in the alpha-value of a pixel located in the first direction from an object OB2' having the depth value set as Z2' into the first level by drawing the object OB2' in the drawing area of the original image, and the (n+1)-th bit in the alpha-value of a pixel located in the first direction from an object OB2 having the depth value set as Z2 and located in the first direction from the object OB2' into the second level by drawing the object OB2 in the drawing area of the original image; . . . and an (n+i−1)-th bit in the alpha-value of a pixel located in the first direction from an object OBi' having the depth value set as Zi' into the first level by drawing the object OBi' in the drawing area of the original image, and the (n+i−1)-th bit in the alpha-value of a pixel located in the first direction from an object OBi having the depth value set as Zi and located in the first direction from the object OBi' into the second level by drawing the object OBi in the drawing area of the original image.

7. A computer-usable program embodied on an information storage medium or in a carrier wave, the program comprising a processing routine to realize:

an alpha-value setting section which sets an alpha-value for each pixel to a value corresponding to a depth value of the each pixel in an original image, wherein the value is not associated with color information; and a synthesizing section which synthesizes the original image with a defocused image corresponding to the original image based on the alpha-value set for each pixel, wherein the alpha-value setting section sets the alpha-value for the each pixel so that a synthesis ratio of the defocused image becomes higher for a pixel having a larger difference between a focal depth value of a virtual camera and the depth value of the each pixel.

8. The program according to claim 7, wherein a range of depth of field or magnitude of defocusing effect is variably controlled by varying a corresponding relationship between the depth value of the each pixel and the alpha-value.

9. The program according to claim 7, wherein the alpha-value setting section sets an alpha-value for a pixel having a depth value located in an area AR1 between Z1 and Z2 as α1, the alpha-value for a pixel having a depth value located in an area AR2 between Z2 and Z3 as α2, . . . , and subsequently the alpha-value for a pixel having a depth value located in an area ARi between Zi and Zi+1 as αi; and wherein the program further comprises a drawing section which draws an image based on the alpha-value set by the alpha-value setting section.

10. The program according to claim 9, wherein the alpha-value setting section updates:

the alpha-value of an pixel located in a first direction from an object OB1 having the depth value set as Z1 by drawing the object OB1 in a drawing area of an original image;

the alpha-value of an pixel located in the first direction from an object OB2 having the depth value set as Z2 by drawing the object OB2 in the drawing area of the original image; . . . and subsequently the alpha-value of an pixel located in the first direction from an object OBi having the depth value set as Zi by drawing the object OBi in the drawing area of the original image.

11. The program according to claim 10, wherein the alpha-value setting section updates only a bit to be updated by masking a bit not to be updated when an object is drawn in the drawing area of the original image to update the alpha-value.

12. The program according to claim 9, wherein the alpha-value setting section updates:

an n-th bit in the alpha-value of a pixel located in a first direction from an object OB1' having the depth value set as Z1' into a first level by drawing the object OB1' in a drawing area of an original image, and the n-th bit in the alpha-value of a pixel located in the first direction from an object OB1 having the depth value set as Z1 and located in the first direction from the object OB1' into a second level by drawing the object OB1 in the drawing area of the original image;

an (n+1)-th bit in the alpha-value of a pixel located in the first direction from an object OB2' having the depth value set as Z2' into the first level by drawing the object OB2' in the drawing area of the original image, and the (n+1)-th bit in the alpha-value of a pixel located in the first direction from an object OB2 having the depth value set as Z2 and located in the first direction from the object OB2' into the second level by drawing the object OB2 in the drawing area of the original image; . . . and an (n+i−1)-th bit in the alpha-value of a pixel located in the first direction from an object OBi' having the depth value set as Zi' into the first level by drawing the object OBi' in the drawing area of the original image, and the (n+i−1 )-th bit in the alpha-value of a pixel located in the first direction from an object OBi having the depth value set as Zi and located in the first direction from the object OBi' into the second level by drawing the object OBi in the drawing area of the original image.

13. An image generating method for generating an image, comprising:

setting an alpha-value for each pixel to a value corresponding to a depth value of the each pixel in an original image, wherein the value is not associated with color information;

synthesizing the original image with a defocused image corresponding to the original image based on the alpha-value set for each pixel; and setting the alpha-value for the each pixel so that a synthesis ratio of the defocused image becomes higher for a pixel having a larger difference between a focal depth value of a virtual camera and the depth value of the each pixel.

14. The image generating method according to claim 13, further comprising:

setting the alpha-value for a pixel having a depth value located in an area AR1 between Z1 and Z2 as α1, the alpha-value for a pixel having a depth value located in an area AR2 between Z2 and Z3 as α2 . . . , and subsequently the alpha-value for a pixel having a depth value located in an area Ari between Zi and Zi+1 as αi; and drawing an image based on the alpha-value set by the alpha-value setting.

15. The image generating method according to claim 14, further comprising:

updating the alpha-value of a pixel located in a first direction from an object OB1 having the depth value set as Z1 by drawing the object OB1 in a drawing area of an original image;

updating the alpha-value of a pixel located in the first direction from an object OB2 having the depth value set as Z2 by drawing the object OB2 in the drawing area of the original image; . . . , and subsequently updating the alpha-value of a pixel located in the first direction from an object OBi having the depth value set as Zi by drawing the object OBi in the drawing area of the original image.

16. The image generating method according to claim 14, further comprising:

updating an n-th bit in the alpha-value of a pixel located in a first direction from an object OB1' having the depth value set as Z1' into a first level by drawing the object OB1' in a drawing area of an original image, and the n-th bit in the alpha-value of a pixel located in the first direction from an object OB1 having the depth value set as Z1 and located in the first direction from the object OB1' into a second level by drawing the object OB1 in the drawing area of the original image;

updating an (n+1)-th bit in the alpha-value of a pixel located in the first direction from an object OB2' having the depth value set as Z2' into the first level by drawing the object OB2' in the drawing area of the original image, and the (n+1)-th bit in the alpha-value of a pixel located in the first direction from an object OB2 having the depth value set as Z2 and located in the first direction from the object OB2' into the second level by drawing the object OB2 in the drawing area of the original image; . . . , and updating an (n+i−1)-th bit in the alpha-value of a pixel located in the first direction from an object OBi' having the depth value set as Zi' into the first level by drawing the object OBi' in the drawing area of the original image, and the (n+i−1)-th bit in the alpha-value of a pixel located in the first direction from an object OBi having the depth value set as Zi and located in the first direction from the object OBi' into the second level by drawing the object OBi in the drawing area of the original image.

* * * * *